United States Patent
Iijima et al.

(10) Patent No.: US 11,394,034 B2
(45) Date of Patent: Jul. 19, 2022

(54) SUPPORT FOR POLYMER ELECTROLYTE FUEL CELL CATALYST, METHOD OF PRODUCING SUPPORT FOR POLYMER ELECTROLYTE FUEL CELL CATALYST, CATALYST LAYER FOR POLYMER ELECTROLYTE FUEL CELL, AND FUEL CELL

(71) Applicant: NIPPON STEEL CHEMICAL & MATERIAL CO., LTD., Tokyo (JP)

(72) Inventors: Takashi Iijima, Tokyo (JP); Kenichiro Tadokoro, Tokyo (JP); Masataka Hiyoshi, Tokyo (JP); Shinya Furukawa, Tokyo (JP); Tomoko Komura, Tokyo (JP); Kazuhiko Mizuuchi, Tokyo (JP)

(73) Assignee: NIPPON STEEL CHEMICAL & MATERIAL CO., LTD., Tokyo (JP)

(*) Notice: Subject to any disclaimer, the term of this patent is extended or adjusted under 35 U.S.C. 154(b) by 159 days.

(21) Appl. No.: 16/626,724

(22) PCT Filed: Jun. 29, 2018

(86) PCT No.: PCT/JP2018/024965
§ 371 (c)(1),
(2) Date: Dec. 26, 2019

(87) PCT Pub. No.: WO2019/004472
PCT Pub. Date: Jan. 3, 2019

(65) Prior Publication Data
US 2020/0287221 A1 Sep. 10, 2020

(30) Foreign Application Priority Data
Jun. 29, 2017 (JP) .............................. JP2017-127399

(51) Int. Cl.
*H01M 4/90* (2006.01)
*B01J 20/30* (2006.01)
(Continued)

(52) U.S. Cl.
CPC ......... *H01M 4/9083* (2013.01); *B01J 20/305* (2013.01); *C01B 32/336* (2017.08);
(Continued)

(58) Field of Classification Search
None
See application file for complete search history.

(56) References Cited

U.S. PATENT DOCUMENTS

2011/0318254 A1 12/2011 Morishita
2015/0352522 A1 12/2015 Mizuuchi et al.
(Continued)

FOREIGN PATENT DOCUMENTS

JP 7-155587 A 6/1995
JP 2006-4916 A 1/2006
(Continued)

OTHER PUBLICATIONS

Machine translation of JP 7-155587, Jun. 1995.*
(Continued)

*Primary Examiner* — Jonathan Crepeau
(74) *Attorney, Agent, or Firm* — Birch, Stewart, Kolasch & Birch, LLP

(57) ABSTRACT

A support for a polymer electrolyte fuel cell catalyst satisfying the following requirements (A), (B), (C), and (D), and a producing method thereof, as well as a catalyst layer for a polymer electrolyte fuel cell and a fuel cell:
(A) a specific surface area according to a BET analysis of a nitrogen adsorption isotherm is from 450 to 1500 m²/g.
(B) a nitrogen adsorption and desorption isotherm forms a hysteresis loop in a range of relative pressure $P/P_0$ of more
(Continued)

than 0.47 but not more than 0.90, and a hysteresis loop area $\Delta S_{0.47\text{-}0.9}$ is from 1 to 35 mL/g;

(C) a relative pressure $P_{close}/P_0$ at which the hysteresis loop closes is more than 0.47 but not more than 0.70; and (D) a half-width of a G band detected by Raman spectrometry in a range of from 1500 to 1700 $cm^{-1}$ is from 45 to 75 $cm^{-1}$.

12 Claims, 4 Drawing Sheets

(51) Int. Cl.
| | |
|---|---|
| *H01M 4/86* | (2006.01) |
| *H01M 4/88* | (2006.01) |
| *H01M 8/10* | (2016.01) |
| *H01M 4/92* | (2006.01) |
| *C01B 32/336* | (2017.01) |
| *C01B 32/342* | (2017.01) |

(52) U.S. Cl.
CPC ............. *C01B 32/342* (2017.08); *H01M 4/86* (2013.01); *H01M 4/8817* (2013.01); *H01M 4/926* (2013.01); *H01M 8/10* (2013.01); *H01M 2004/8689* (2013.01); *H01M 2008/1095* (2013.01)

(56) References Cited

U.S. PATENT DOCUMENTS

| | | |
|---|---|---|
| 2016/0329571 A1 | 11/2016 | Matsumoto et al. |
| 2017/0194652 A1 | 7/2017 | Iijima et al. |
| 2018/0069247 A1 | 3/2018 | Iijima et al. |
| 2019/0030514 A1 | 1/2019 | Uchida et al. |

FOREIGN PATENT DOCUMENTS

| | | |
|---|---|---|
| JP | 2010-208887 A | 9/2010 |
| JP | 2017-91812 A | 5/2017 |
| WO | WO 2014/129597 A1 | 8/2014 |
| WO | WO 2015/088025 A1 | 6/2015 |
| WO | WO 2015/141810 A1 | 9/2015 |
| WO | WO 2016/133132 A1 | 8/2016 |
| WO | WO 2017/094648 A1 | 6/2017 |

OTHER PUBLICATIONS

International Search Report for PCT/JP2018/024965 dated Oct. 2, 2018.

Thommes et al., "Adsorption Hysteresis of Nitrogen and Argon in Pore Networks and Characterization of Novel Micro- and Mesoporous Silica", Langmuir, 2006, vol. 22, pp. 756-764.

Written Opinion of the International Searching Authority for PCT/JP2018/024965 dated Oct. 2, 2018.

Chinese Second Office Action and Search Report (including an English translation thereof) issued in the corresponding Chinese Patent Application No. 201880043027.5 dated Apr. 19, 2022.

* cited by examiner

[FIG. 1]
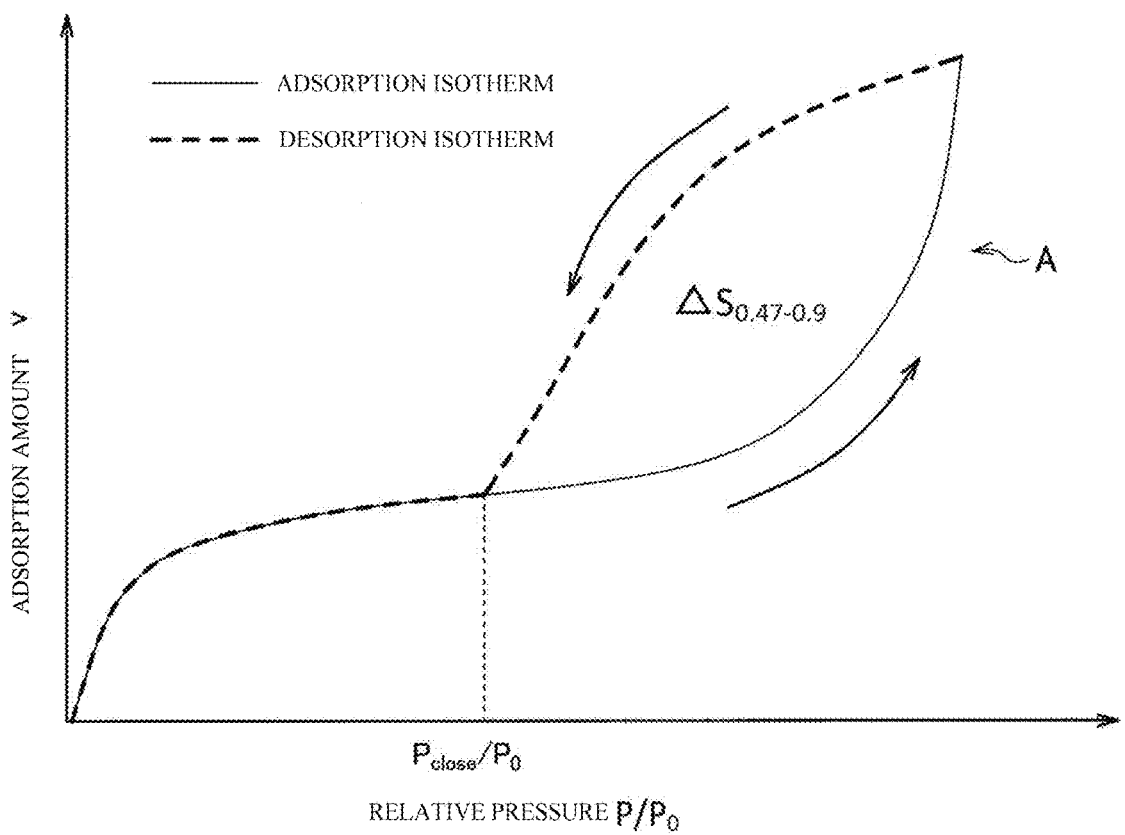
[FIG. 2]
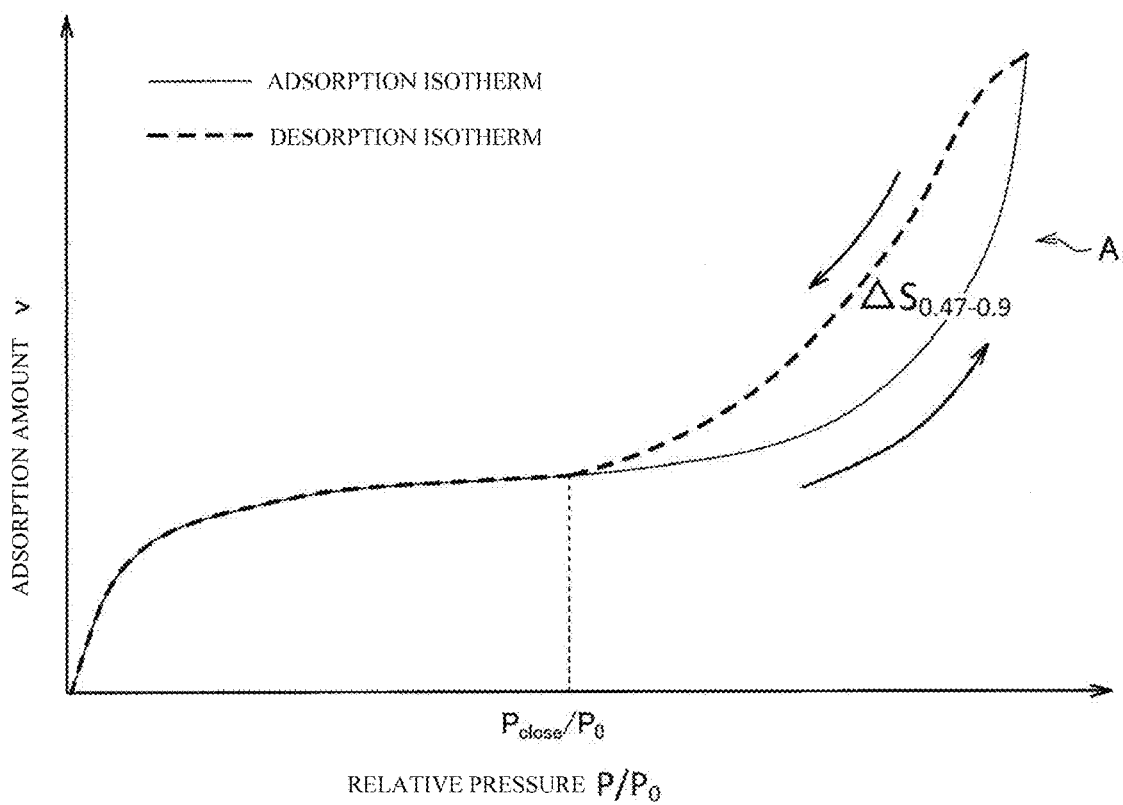

[FIG. 3]
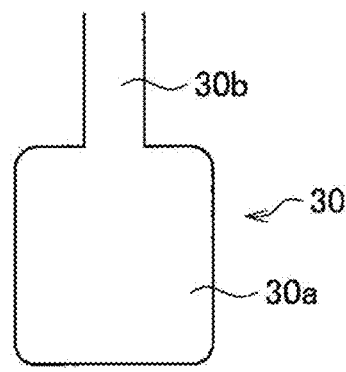
[FIG. 4]
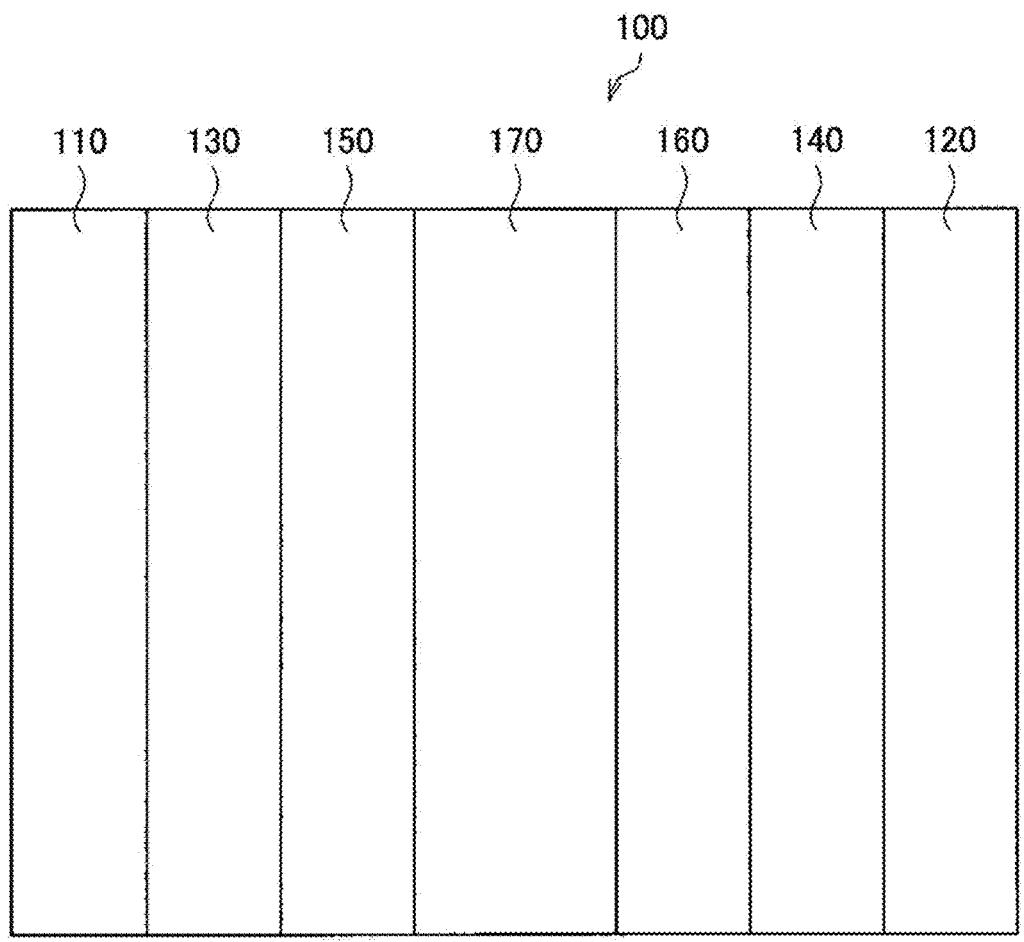

[FIG. 5]
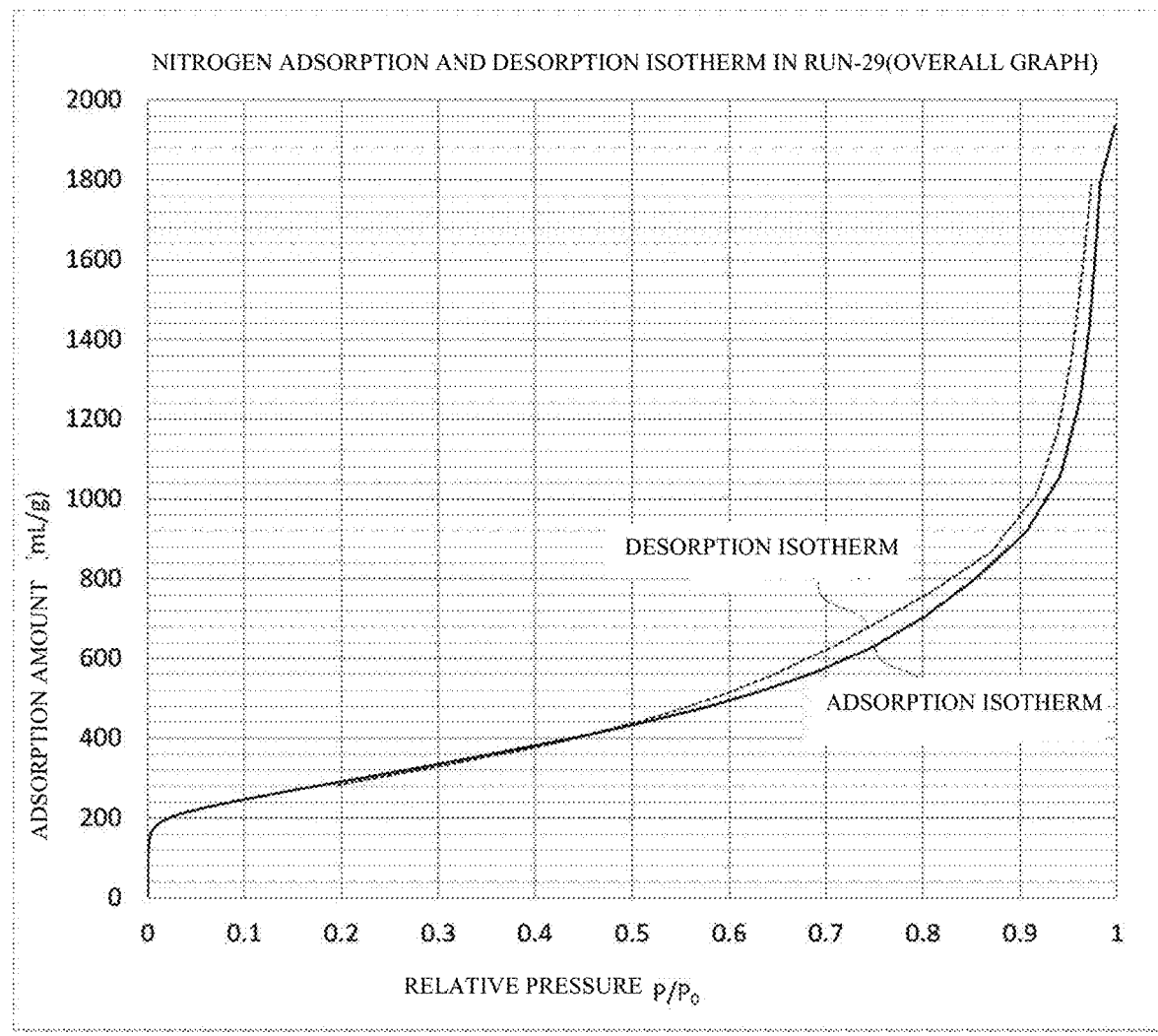

[FIG. 6]
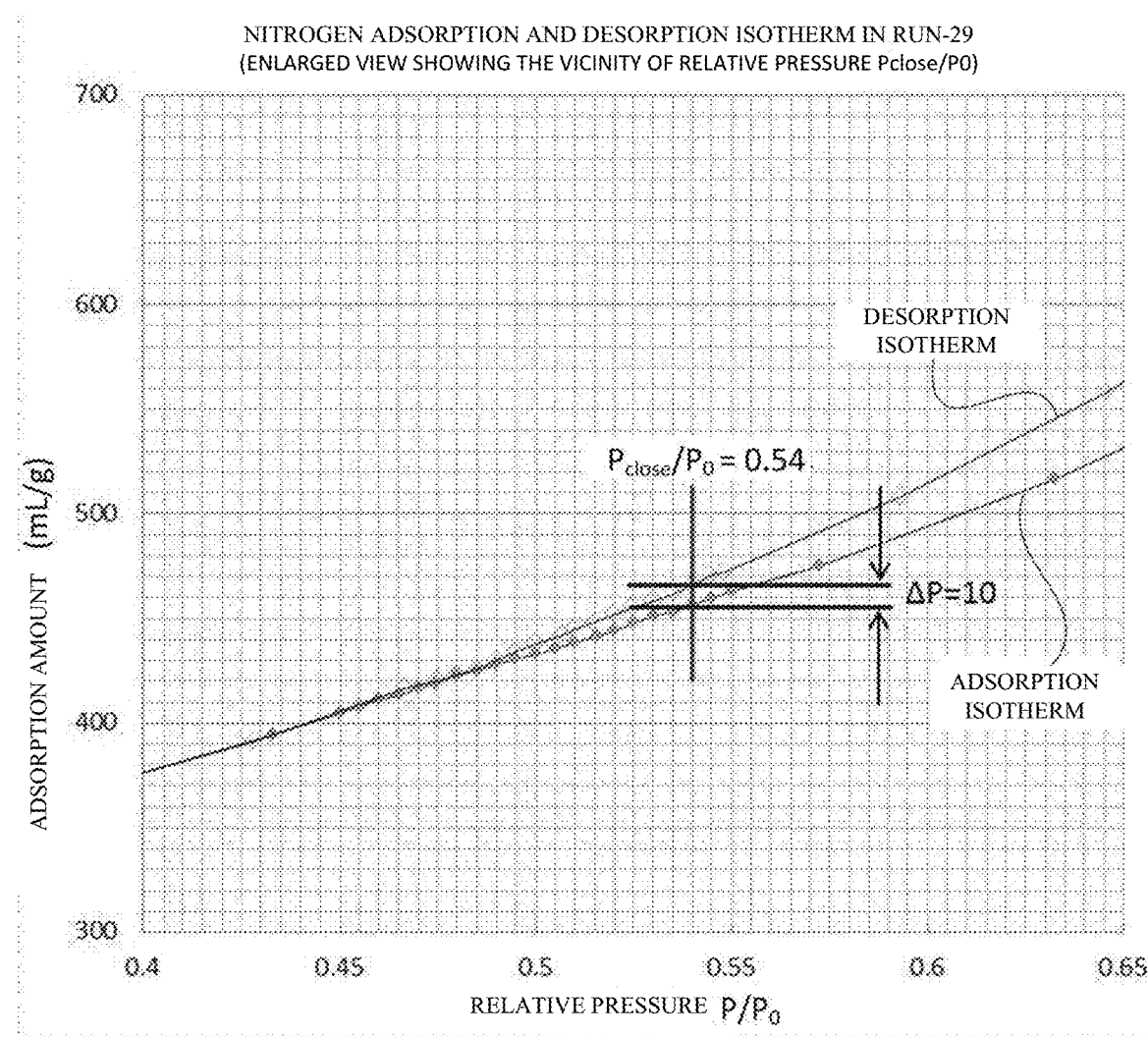

SUPPORT FOR POLYMER ELECTROLYTE FUEL CELL CATALYST, METHOD OF PRODUCING SUPPORT FOR POLYMER ELECTROLYTE FUEL CELL CATALYST, CATALYST LAYER FOR POLYMER ELECTROLYTE FUEL CELL, AND FUEL CELL

TECHNICAL FIELD

The present disclosure relates to a support for a polymer electrolyte fuel cell catalyst, a method of producing a support for a polymer electrolyte fuel cell catalyst, a catalyst layer for a polymer electrolyte fuel cell, and a fuel cell.

BACKGROUND ART

A polymer electrolyte fuel cell, which is a kind of fuel cell, is provided with a pair of catalyst layers placed on each side of a polymer electrolyte membrane, gas diffusion layers placed on the outside of each catalyst layer, and separators placed on the outside of each gas diffusion layer. Of the pair of catalyst layers, one catalyst layer will serve as the anode of a polymer electrolyte fuel cell, and the other catalyst layer will serve as the cathode of the polymer electrolyte fuel cell. In this regard, in an ordinary polymer electrolyte fuel cell, a plurality of unit cells having the aforedescribed components are stacked in order to attain a desired output power.

A fuel gas such as hydrogen is introduced into the separator on the anode side. The gas diffusion layer on the anode side diffuses a fuel and then introduces it into the anode. The anode includes a catalyst component, a catalyst support supporting a fuel cell catalyst, and an electrolyte material having proton conductivity. A catalyst component that promotes a power generation reaction (an oxidation reaction or a reduction reaction described later) in the fuel cell is hereinafter also referred to as a "fuel cell catalyst". The catalyst support is frequently composed of a porous carbon material. On the fuel cell catalyst, an oxidation reaction of a fuel gas occurs to generate protons and electrons. For example, when the fuel gas is a hydrogen gas, the following oxidation reaction occurs.

$$H_2 \rightarrow 2H^+ + 2e^- (E_0 = 0 \text{ V})$$

Protons generated by the oxidation reaction are introduced into the cathode through the electrolyte material in the anode and a polymer electrolyte membrane. Electrons are introduced into an external circuit through the catalyst support, gas diffusion layer, and separator. These electrons work in the external circuit and then are introduced into the separator on the cathode side. The electrons are then introduced into the cathode through the separator on the cathode side, and the gas diffusion layer on the cathode side.

A polymer electrolyte membrane is composed of an electrolyte material having proton conductivity. The polymer electrolyte membrane introduces protons generated by the above oxidation reaction into the cathode.

An oxidizing gas such as an oxygen gas or air is introduced into the separator on the cathode side. The gas diffusion layer on the cathode side diffuses the oxidizing gas and introduces it into the cathode. The cathode includes a fuel cell catalyst, a catalyst support supporting the fuel cell catalyst, and an electrolyte material having proton conductivity. The catalyst support is frequently composed of a porous carbon material. On a fuel cell catalyst, a reduction reaction of an oxidizing gas occurs and water is generated. For example, when an oxidizing gas is an oxygen gas or air, the following reduction reaction occurs.

$$O_2 + 4H^+ + 4e^- \rightarrow 2H_2O (E_0 = 1.23 \text{ V})$$

The water generated by the reduction reaction is discharged outward from the fuel cell together with an unreacted oxidizing gas. By this way, a polymer electrolyte fuel cell generates electric power utilizing the free energy difference (electric potential difference) to be generated by the oxidation reaction of the fuel gas. In other words, the free energy generated by the oxidation reaction is converted into work that electrons perform in an external circuit.

Meanwhile, as disclosed in Patent Documents 1 to 4, a technique of using a dendritic carbon nanostructure as a catalyst support has been proposed in recent years. A dendritic carbon nanostructure has a characteristic structure not found in other carbon materials. Specifically, a dendritic carbon nanostructure has both a highly developed pore structure (porous structure) and a large scale dendritic structure at the same time. That is, the support particles constituting MCND have a large number of pores capable of supporting a fuel cell catalyst therein, and have also a large dendritic structure.

In Patent Document 5, a technique by which a porous carbon (MgO template carbon) material using a magnesium oxide nanoparticle as template is used as a source material, and further porous carbon heat-treated in air is used as a catalyst support, has been proposed. Although MgO template carbon is generally characterized in that it has uniform pores deep into the material, Patent Document 5 further proposes a technique by which walls constituting pores in MgO template carbon are consumed by oxidation by heating the MgO template carbon in air (that is, air-based activation). In other words, Patent Document 5 proposes a material in which the thickness of the partition between the pores will be eventually reduced (that is, the communication property will be improved).

Patent Document 1: International Publication No. WO 2014/129597
Patent Document 2: International Publication No. WO 2015/088025
Patent Document 3: International Publication No. WO 2015/141810
Patent Document 4: International Publication No. WO 2016/133132
Patent Document 5: Japanese Patent Application Laid-Open (JP-A) No. 2017-91812
Non Patent Document 1: Adsorption Hysteresis of Nitrogen and Argon in Pore Networks and Characterization of Novel Micro- and Mesoporous Silicas, Langmuir, 2006, 22, 756-764

SUMMARY OF INVENTION

Technical Problem

Meanwhile, there has been a problem that overvoltage tends to rise when large current flows in a polymer electrolyte fuel cell. In particular, when a polymer electrolyte fuel cell is applied to the power source for an automobile, there has been a strong demand for reducing the overvoltage at the time of high current. Regarding this problem, it is possible to lower overvoltage by using MCND as a catalyst support. However, in order to further improve the performance of a polymer electrolyte fuel cell, it has been necessary to further reduce the overvoltage. On the other hand, a catalyst support has been required to have further improved durability.

In particular, MgO template carbon of Patent Document 5 has a particulate shape (no three-dimensional structure). Therefore, although the gas flow property in the particle is improved, a catalyst layer constituted with particles has a small pore volume, and further it is difficult to control the pore size. As a result, the gas diffusion in the catalyst layer rather than the gas diffusion in the particle is rate determining, and there is a problem that the overvoltage at the time of high current cannot be reduced.

The present disclosure has been made in view of the above problems, and an object of the present disclosure is to provide a support for a polymer electrolyte fuel cell catalyst, a method of producing the support for a polymer electrolyte fuel cell catalyst, a catalyst layer for a polymer electrolyte fuel cell, and a fuel cell, which are novel and improved, and in which the overvoltage at the time of high current is reduced and the durability is improved.

Solution to Problem

First, the present inventors have considered that the transfer resistance (diffusion resistance) of substances involved in a reaction on the cathode side is one of the controlling factors affecting the overvoltage at the time of high current. In this regard, the substances involved in the reaction on the cathode side are electrons, protons, an oxidizing gas, and water (water vapor) generated by the reaction on the cathode side. Among these substances, electrons and protons are considered to exhibit ohmic behaviors (that is, the resistance value is not affected by the magnitude of the current), and no peculiar behavior is exhibited at the time of high current.

On the other hand, the diffusion of an oxidizing gas and water vapor depends on the pore structure of a porous carbon material used as a support for a catalyst component. Specifically, when a porous carbon material has a large pore size, less bends, and less necks, such that a gas can easily diffuse in the porous carbon material, a gas necessary for high current can be easily supplied. That is, the gas diffusion resistance can be small. As a result, the voltage drop associated with high current can be reduced (that is, overvoltage associated with high current is small). As described above, it is conceivable that the diffusion resistance of a gas flowing in the cathode (so-called gas diffusion resistance) is a controlling factor for overvoltage at the time of high current. In other words, when the diffusion resistance increases, it becomes more difficult for an oxidizing gas to reach the fuel cell catalyst in the catalyst support. In this case the fuel cell catalyst to which the oxidizing gas is not delivered cannot contribute to a power generation reaction on the cathode side (that is, reduction reaction). As a result, the overvoltage at the time of high current increases.

In addition, the present inventors have considered that flooding is also a controlling factor that affects the overvoltage at the time of high current. In this regard, flooding means that water vapor (gas phase) generated by the cathode reaction is converted into a liquid phase in the catalyst layer, and the pores are blocked by the liquid water.

When electricity is generated at high current, a large amount of water vapor is generated at the cathode. Such water vapor tends to stay in the pores when the diffusion resistance of the pores in a catalyst support is large. The smaller the pore diameter is, the larger the diffusion resistance becomes.

Therefore, the smaller the pore diameter is, the easier for the water vapor to stay in the pores. In other words, the water vapor pressure is more likely to increase. On the other hand, the saturation vapor pressure becomes lower, as the pore diameter decreases. Thus, when the pore diameter becomes smaller, the water vapor is more easily converted to a liquid phase in the pores, and the liquid phase closes the pores. That is, flooding occurs in the pores. In this case the oxidizing gas is hardly delivered to the fuel cell catalyst supported deeply inside the pore. And the fuel cell catalyst to which the oxidizing gas is not delivered cannot contribute to a power generation reaction on the cathode side. As a result, the overvoltage at the time of high current increases.

The present inventors have considered that a bottleneck pore is one of the causes of increase in gas diffusion resistance and flooding. FIG. 3 shows a bottleneck pore 30 as an example of a bottleneck pore. The bottleneck pore 30 is configured with a bottle part 30a and a neck part 30b communicating with the bottle part 30a. The diameter of the bottle part 30a is larger than the diameter of the neck part 30b. Further, the neck part 30b communicates with the outer surface of a carbon material or another pore in the carbon material.

As is obvious from FIG. 3, since the diameter of the neck part is smaller than the diameter of the bottle part, it is difficult for a gas to flow in the bottle part. That is, the gas diffusion resistance increases. Furthermore, as for a saturated vapor pressure, since the saturated vapor pressure at the neck part is lower than the saturated vapor pressure at the bottle part, flooding is more likely to occur at the neck part. Therefore, the fuel cell catalyst supported at the bottle part is less likely to contribute to a power generation reaction on the cathode side.

When the ratio of the volume of bottleneck pores to the volume of the entire pores in the catalyst support is higher, or when the minimum diameter of neck parts (the minimum diameter of all the neck parts existing in the catalyst support) is smaller, and the volume of the corresponding bottle part is larger, the gas diffusion resistance increases. Also, flooding is likely to occur.

Therefore, the present inventors have investigated a technique for reducing the volume ratio of bottleneck pores and increasing the minimum diameter of neck parts. First, the present inventors have investigated a technique for evaluating the volume ratio of bottleneck pores and the minimum diameter of neck parts. Specifically, the present inventors have focused on the nitrogen adsorption isotherm and nitrogen desorption isotherm. In this regard, a nitrogen adsorption isotherm and a nitrogen desorption isotherm are obtained by a nitrogen gas adsorption measurement. The nitrogen adsorption isotherm is an isotherm with respect to nitrogen adsorption, and the nitrogen desorption isotherm is an isotherm with respect to nitrogen desorption. Hereinafter, an isotherm integrating the nitrogen adsorption isotherm and the nitrogen desorption isotherm (namely, an isotherm connecting the two isotherms together) is also referred to as a nitrogen adsorption and desorption isotherm.

FIG. 1 shows an example of a nitrogen adsorption and desorption isotherm. The nitrogen adsorption and desorption isotherm shown in FIG. 1 is a schematic nitrogen adsorption and desorption isotherm of a conventional carbon material as a catalyst support. The nitrogen adsorption and desorption isotherm forms a hysteresis loop A.

There are various theories concerning the cause of appearance of the hysteresis loop. For example, a theory tells that a hysteresis loop appears when a bottleneck pore exists. According to this theory, as will be described below, a hysteresis loop is formed due to the difference between the adsorption process and the desorption process. That is, in the adsorption process, the adsorption thickness of nitrogen gradually increases along with the relative pressure of a nitrogen gas. In this course, the neck part of a bottleneck pore is first blocked by adsorption, but even when nitrogen is adsorbed at the bottle part with the same thickness as the neck part, the bottle part is not yet filled up due to a larger diameter of the bottle part compared to the diameter of the neck part. In this state, even though the neck part is blocked, the pressure in the bottle part is in equilibrium with the exterior pressure through the nitrogen adsorption layer. Therefore, when the relative pressure of a nitrogen gas (that is, external pressure) further increases, the pressure inside the bottle part also increases. Consequently, adsorption corresponding to the external pressure advances also in the bottle part to increase the thickness of the nitrogen adsorption layer in the bottle part. When the external pressure increases further, the bottle part is eventually blocked completely by the nitrogen adsorption layer. In other words, even in the case of a bottleneck pore, the adsorption process can proceed in the same manner as in an ordinary pore. However, strictly speaking, when the neck part is blocked by a nitrogen adsorption layer, at least part of the nitrogen adsorption layer adsorbed on the neck part becomes liquid. It has been known that the pressure inside the liquid phase (that is, the pressure inside the bottle part) is slightly lower than the external pressure due to the surface tension of the liquid phase. This phenomenon is called capillarity. For this reason, with respect to the adsorption isotherm of a bottleneck pore, the relative pressure required for obtaining the same adsorption amount as a non-bottleneck pore is slightly shifted to a higher value.

Next, the desorption process of nitrogen from the state where all the bottleneck pores are filled will be discussed. In the detachment process, the neck part does not reopen until the external pressure drops to a pressure at which the neck part can be unblocked. In the course of reduction of the external pressure to a pressure at which the neck part is unblocked, the external pressure comes to a pressure at which the adsorption at the bottle part can be released. However, even in this state, the nitrogen adsorbed inside the bottle part is retained as it is due to the blockage of the neck part (so-called blocking phenomenon). When a desorption isotherm is measured using nitrogen as an adsorbate at a liquid nitrogen temperature (for example, 77 K), the nitrogen adsorption layer in the neck part starts boiling (cavitation) at a relative pressure higher than the pressure at which the neck reopens. As a result, the nitrogen adsorbed at the bottle part and the neck part is desorbed and released at once at a pressure at which the nitrogen adsorption layer starts boiling. At this pressure $P_{close}$ the hysteresis loop closes. The relative pressure $P_{close}/P_0$, at which the hysteresis loop closes (namely, the cavitation occurs) is about 0.4. The relative pressure $P_{close}/P_0$ is determined by the adsorbate and the measurement temperature irrespective of the pore structure. The phenomenon of hysteresis is described in detail in, for example, Non Patent Document 1.

The inventors further investigated this theory. As a result, the inventors have found that when the minimum diameter of neck parts is larger than the diameter at which cavitation occurs, the hysteresis loop closes at a relative pressure corresponding to the minimum diameter of neck parts. Such knowledge was not known at all in the past, and a carbon material obtained based on such knowledge has heretofore not existed. Therefore, when the minimum diameter of neck parts is large (specifically, larger than the diameter at which cavitation occurs), the nitrogen desorption isotherm crosses the nitrogen adsorption isotherm at a relative pressure corresponding to the minimum diameter of neck parts. That is, the hysteresis loop closes. In other words, in this case the hysteresis loop closes not by falling due to cavitation but by falling at a relative pressure corresponding to the diameter of the neck part. Therefore, a higher relative pressure $P_{close}/P_0$ at which the hysteresis loop closes means a larger minimum diameter of neck parts.

Also, the volume ratio of bottleneck pores corresponds to the area of the hysteresis loop. As described above, in a bottleneck pore, desorption of a nitrogen gas is prevented by the blocking phenomenon. Therefore, when the volume ratio of bottleneck pores becomes larger, falling of the nitrogen desorption isotherm becomes less likely to occur. As a result, the area of the hysteresis loop increases. Conversely, it can be said that the smaller the area of the hysteresis loop is, the smaller the volume ratio of bottleneck pores becomes.

Thus, the present inventors have found that the volume ratio of bottleneck pores and the minimum diameter of neck parts may be estimated using a nitrogen adsorption and desorption isotherm.

Also in the past, a carbon material was evaluated based on a nitrogen adsorption isotherm. However, it was not possible to evaluate the characteristics of a carbon material (particularly characteristics at high current) solely from a nitrogen adsorption isotherm. For example, Ketjenblack is also widely used as a catalyst support for a polymer electrolyte fuel cell. By performing gas-based activation (for example, $CO_2$ gas-based activation) on Ketjenblack, the total pore volume can be increased. When the Ketjenblack undergone a gas-based activation is used as a catalyst support, the gas diffusion resistance is reduced, and the overvoltage at the time of high current tends to be decreased. However, the area of the aforedescribed hysteresis loop is not decreased by the gas-based activation, rather tends to be increased. That is, the volume ratio of bottleneck pores is increased. Consequently, it was not possible to evaluate sufficiently the characteristics of a carbon material, especially characteristics at high current only by a nitrogen adsorption isotherm focusing only on the adsorption process.

Next, the inventors examined a technique for increasing the minimum diameter of neck parts, and decreasing the volume ratio of bottleneck pores. As a neck parts, and decreasing the volume ratio of bottleneck pores by activating a porous carbon material to be used as a catalyst support with an activation catalyst (that is, catalyst-based activation).

It can be confirmed by a nitrogen adsorption and desorption isotherm that the minimum diameter of neck parts is increased and the volume ratio of bottleneck pores is decreased. That is, in the carbon material having undergone the above activation, a relative pressure at which the hysteresis loop closes increases, and the area of the hysteresis loop decreases. FIG. 2 shows schematically a nitrogen adsorption and desorption isotherm of a carbon material having undergone the above catalyst-based activation (that is, a support for a polymer electrolyte fuel cell catalyst according to an embodiment of the present disclosure). As obvious from FIG. 2, the area $\Delta S_{0.47\text{-}0.9}$ of the hysteresis loop A is smaller than that of FIG. 1, and the relative pressure $P_{close}/P_0$ at which the hysteresis loop A closes is higher than that of FIG. 1.

The present inventors conceive that the activation catalyst selectively reduces the wall at the neck part to increase the minimum diameter of neck parts and reduce the volume ratio of bottleneck pores. That is, the wall at the neck part is selectively thinned so that the bottleneck pore is modified to a cylindrical shape. As a result, the minimum diameter of neck parts is increased. Further, from modification of the bottleneck pore to a cylindrical shape, the pore is not any more a bottleneck pore. Therefore, the volume ratio of bottleneck pores decreases.

Further, the present inventors heat-treated at a high temperature a carbon material after the aforedescribed catalyst-based activation, so as to increase the durability of the carbon material. Further, it was confirmed that the same effect was exhibited even when the catalyst-based activation was performed after the heat treatment at a high temperature was conducted before the catalyst-based activation. In this regard, since a site affected by oxidation exhaustion caused by catalyst-based activation constitutes a starting point of oxidation exhaustion, the resistance to oxidation exhaustion may be decreased by catalyst-based activation compared to that before the catalyst-based activation. Therefore, it was confirmed that the resistance to oxidation exhaustion could be enhanced by a heat treatment at high temperature before the catalyst-based activation, and performing again a heat treatment at high temperature after the catalyst-based activation. Based on the above findings, the present inventors achieved the support for a polymer electrolyte fuel cell catalyst according to the present disclosure.

That is, according to a certain aspect of the present disclosure, the present disclosure includes the following aspects.
<1> A support for a polymer electrolyte fuel cell catalyst including a carbon material, and satisfying the following requirements (A), (B), (C), and (D):
(A) a specific surface area according to a BET analysis of a nitrogen adsorption isotherm is from 450 to 1500 m$^2$/g;
(B) a nitrogen adsorption and desorption isotherm forms a hysteresis loop in a range of relative pressure P/P$_0$ of more than 0.47 but not more than 0.90, and a hysteresis loop area $\Delta S_{0.47\text{-}0.9}$ is from 1 to 35 mL/g;
(C) a relative pressure P$_{close}$/P$_0$ at which the hysteresis loop closes is more than 0.47 but not more than 0.70; and
(D) a half-width of a G band detected by Raman spectrometry in a range of from 1500 to 1700 cm$^{-1}$ is from 45 to 75 cm$^{-1}$.
<2> The support for a polymer electrolyte fuel cell catalyst according to <1>, further satisfying the following requirement (E):
(E) an adsorption volume V$_{0.2\text{-}0.9}$ measured from the nitrogen adsorption isotherm in a relative pressure range of from 0.20 to 0.90 is from 150 to 700 mL/g.
<3> The support for a polymer electrolyte fuel cell catalyst according to <1> or <2>, wherein the hysteresis loop area $\Delta S_{0.47\text{-}0.9}$ is from 5 to 35 mL/g.
<4> The support for a polymer electrolyte fuel cell catalyst according to <1> or <2>, wherein the hysteresis loop area $\Delta S_{0.47\text{-}0.9}$ is from 15 to 35 mL/g.
<5> The support for a polymer electrolyte fuel cell catalyst according to any one of <1> to <4>, wherein the relative pressure P$_{close}$/P$_0$ at which the hysteresis loop closes is from 0.50 to 0.70.
<6> A method of producing a support for a polymer electrolyte fuel cell catalyst, the method including:
a support step of supporting an activation catalyst, which promotes an activation reaction on a porous carbon material in pores in the porous carbon material to produce a carbon material supporting the activation catalyst; and
a first heat treatment step of heat-treating the carbon material supporting an activation catalyst in an oxygen-containing atmosphere in a range of from 300° C. to 700° C.
<7> The method of producing a support for a polymer electrolyte fuel cell catalyst according to <6>, further including a second heat treatment step of heating the carbon material supporting the activation catalyst in a vacuum or in an inert gas atmosphere in a range of from 1600 to 2100° C., the second heat treatment step being performed at least one of before or after the first heat treatment step.
<8> The method of producing a support for a polymer electrolyte fuel cell catalyst according to <6> or <7>, wherein: in the supporting step, in a case in which a particle diameter of the activation catalyst is from 2 to 7 nm, and the activation catalyst is a noble metal element, a support rate of the activation catalyst is from 3 to 20% by mass, and in a case in which the activation catalyst is a 3d element, a support rate of the activation catalyst is from 3 to 9% by mass; and
in the first heat treatment step, an oxygen concentration of the oxygen-containing atmosphere is from 5 to 100% by volume with respect to a total volume of atmosphere gas, and a heat treatment time is from 20 min to 20 hours.
<9> The method of producing a support for a polymer electrolyte fuel cell catalyst according to any one of <6> to <8>, further including an activation catalyst removal step of removing the activation catalyst that is performed after the first heat treatment step.
<10> A catalyst layer for a polymer electrolyte fuel cell including the support for a polymer electrolyte fuel cell catalyst according to any one of <1> to <5>.
<11> A fuel cell including the catalyst layer for a polymer electrolyte fuel cell according to <10>.
<12> The fuel cell according to <11>, wherein the catalyst layer for a polymer electrolyte fuel cell is a catalyst layer on a cathode side.

Advantageous Effects of Invention

As described above, according to the present disclosure, in a support for a polymer electrolyte fuel cell catalyst of the present disclosure the minimum diameter of neck parts can be large, the volume ratio of bottleneck pores can be small, the gas diffusion resistance can be decreased, and occurrence of flooding can be suppressed. Therefore, overvoltage at the time of high current can be further lowered. In addition, since a support for a polymer electrolyte fuel cell catalyst of the present disclosure has high crystallinity, the durability can be also improved.

BRIEF DESCRIPTION OF DRAWINGS

FIG. 1 is a graph schematically showing a nitrogen adsorption and desorption isotherm of a conventional carbon material as a catalyst support.

FIG. 2 is a graph schematically showing a nitrogen adsorption and desorption isotherm of a support for a polymer electrolyte fuel cell catalyst (carbon material as a catalyst support) of an embodiment of the present disclosure.

FIG. 3 is an explanatory diagram schematically showing an example of a bottleneck pore.

FIG. 4 is a schematic diagram showing a skeleton structure of a fuel cell of the present embodiment.

FIG. 5 is a graph showing a nitrogen adsorption and desorption isotherm of the carbon material as a catalyst support of Experiment number Run-29.

FIG. 6 is an enlarged view showing the vicinity of relative pressure P$_{close}$/P$_0$ where the hysteresis loop closes of the nitrogen adsorption and desorption isotherm shown in FIG. 5.

DESCRIPTION OF EMBODIMENTS

A preferred embodiment of the present disclosure will be described in detail below with reference to attached drawings.

In this description and the drawings, elements that have substantially the same function and structure are denoted with the same reference signs, and repeated explanation is omitted.

A numerical range expressed by "x to y" includes herein the values of x and y in the range as the minimum and maximum values, respectively, unless otherwise specified.

When x and/or y is modified with the term "more than", "less than", or the like, the range does not include the values of x and y as the minimum and maximum values, respectively.

The term "step" includes herein not only an independent step, but also a step which may not necessarily be clearly separated from another step, insofar as an intended function of the step can be attained.

A "support for a polymer electrolyte fuel cell catalyst" is also referred to as "carbon material as a catalyst support".

With respect to the relative pressure $P/P_0$ of a nitrogen adsorption and desorption isotherm, "P" stands for the pressure of an adsorbate gas (nitrogen in this embodiment) in an adsorption equilibrium, and "$P_0$" stands for the saturated vapor pressure of the adsorbate (nitrogen in this embodiment) at an adsorption temperature.

<1. Support for Polymer Electrolyte Fuel Cell Catalyst>

First, the structure of a support for a polymer electrolyte fuel cell catalyst according to the present embodiment will be described. In a support for a polymer electrolyte fuel cell catalyst of the present embodiment, the minimum diameter of neck parts is increased, and the volume ratio of the bottleneck pores is decreased. Specifically, a support for a polymer electrolyte fuel cell catalyst of the present embodiment is composed of a carbon material (carbon material as a catalyst support) satisfying the following requirement (A), (B), (C), and (D).

(A) the specific surface area according to a BET analysis of a nitrogen adsorption isotherm is from 450 to 1500 $m^2/g$.
(B) a nitrogen adsorption and desorption isotherm forms a hysteresis loop in a range of relative pressure $P/P_0$ of more than 0.47 but not more than 0.90, and the hysteresis loop area $\Delta S_{0.47-0.9}$ is from 1 to 35 mL/g;
(C) the relative pressure $P_{close}/P_0$ at which the hysteresis loop closes is more than 0.47 but not more than 0.7; and
(D) the half-width of a G band detected by Raman spectrometry in a range of from 1500 to 1700 $cm^{-1}$ is from 45 to 75 $cm^{-1}$.

(1-1. Requirement (A))

The specific surface area according to a BET analysis of a nitrogen adsorption isotherm (hereinafter also referred to as "BET specific surface area") is from 450 to 1500 $m^2/g$. In this way a larger amount of catalyst component can be supported. When the BET specific surface area is less than 450 $m^2/g$, the supporting capacity for the catalyst component may be lowered. When the BET specific surface area exceeds 1500 $m^2/g$, it becomes difficult to secure both the physical strength (mechanical strength) and the durability (resistance to oxidation exhaustion) of the carbon material as a catalyst support.

The lower limit of the BET specific surface area is preferably 500 $m^2/g$ or more, and more preferably 550 $m^2/g$ or more from the viewpoint of suppressing decrease in the supporting capacity for a catalyst component.

Meanwhile, the upper limit of the BET specific surface area is preferably 1400 $m^2/g$ or less, and more preferably 1300 $m^2/g$ or less from the viewpoint of securing both the physical strength (mechanical strength) and the durability (resistance to oxidation exhaustion) of the carbon material as a catalyst support.

In this regard, the BET specific surface area is a value measured by the measuring method specified in the examples described later.

(1-2. Requirement (B))

A nitrogen adsorption and desorption isotherm forms a hysteresis loop in a range of relative pressure $P/P_0$ of more than 0.47 but not more than 0.90, and the hysteresis loop area $\Delta S_{0.47-0.9}$ is from 1 to 35 mL/g. This requirement (B) is a requirement related to the volume ratio of bottleneck pores. In this embodiment, the area of the hysteresis loop $\Delta S_{0.47-0.9}$ is as very small as from 1 to 35 mL/g, so that the volume ratio of bottleneck pores can be very small. Therefore, the gas diffusion resistance is lowered, and flooding is less likely to occur. As a result, the overvoltage at the time of high current decreases. When the hysteresis loop area $\Delta S_{0.47-0.9}$ exceeds 35 mL/g, the volume ratio of bottleneck pores increases, and the overvoltage at the time of high current does not decrease sufficiently. When the hysteresis loop area $\Delta S_{0.47-0.9}$ is less than 1 mL/g, 50% or more of the mass of the carbon walls constituting pores inside the porous carbon material is lost by oxidation exhaustion. As a result, the macroscopic mechanical strength of the porous carbon material itself is weakened. For example, when a force is applied to a powder at a preparation step of an ink for forming an electrode, the powder is apt to be collapsed to cause remarkable reduction of the number of pores. As a result, the overvoltage at the time of high current increases.

The upper limit 0.90 of the relative pressure range corresponds to the pore with a radius of about 10 nm, and substantially all the pores of a porous carbon material supporting a fuel cell catalyst are included. Meanwhile, the lower limit of more than 0.47 of the relative pressure range is equal to the lower limit of the relative pressure $P_{close}/P_0$ of the requirement C.

The lower limit of the hysteresis loop area $\Delta S_{0.47-0.9}$ is preferably 5 mL/g or more, more preferably 10 mL/g or more, and further preferably 15 mL/g or more from the viewpoint of reducing the overvoltage at the time of high current.

Meanwhile, the upper limit of the hysteresis loop area $\Delta S_{0.47-0.9}$ is preferably 32 mL/g or less, and more preferably 30 mL/g or less from the viewpoint of reducing the overvoltage at the time of high current.

In this regard, the hysteresis loop area $\Delta S_{0.47-0.9}$ is a value measured by the measurement method specified in the examples described later.

(1-3. Requirement (C))

The relative pressure $P_{close}/P_0$ at which the hysteresis loop closes is more than 0.47 but not more than 0.7. This requirement (C) is a requirement related to the minimum diameter of bottleneck pores (that is, the minimum diameter of neck parts). Since the relative pressure $P_{close}/P_0$ at which the hysteresis loop closes is as high as more than 0.47 but not more than 0.7, the minimum diameter of neck parts is large. For this reason, the gas diffusion resistance is lowered and flooding is less likely to occur. The pore diameter corresponding to the relative pressure $P_{close}/P_0$ is approximately from 2 to 7 nm. A pore diameter in this embodiment means a diameter determined by a nitrogen gas adsorption measurement. For obtaining a carbon material as a catalyst support in which the relative pressure $P_{close}/P_0$ exceeds 0.7, it becomes necessary to perform excessively catalyst-based activation described later. In this case there may arise another problem that the mechanical strength of the carbon material as a catalyst support rather decreases, or the durability decreases. When the relative pressure $P_{close}/P_0$ is 0.47 or less, the minimum diameter of neck parts is reduced. For this reason, the gas diffusion resistance increases, and flooding is likely to occur. As a result, the overvoltage at the time of high current is likely to increase.

The lower limit of the relative pressure $P_{close}/P_0$ at which the hysteresis loop closes is preferably 0.50 or more, and more preferably 0.53 or more from the viewpoint of reducing the overvoltage at the time of high current.

Meanwhile, the upper limit of the relative pressure $P_{close}/P_0$ at which the hysteresis loop closes means that there is no inhibitory factor on a gas flow in a pore larger than a pore diameter corresponding to a relative pressure higher than the upper limit relative pressure. Therefore, the lower the relative pressure is, the better the gas flows, namely the better the characteristics at high current are. Therefore, the upper limit of the relative pressure $P_{close}/P_0$ is preferably 0.69 or less, and more preferably 0.68 or less.

The relative pressure $P_{close}/P_0$ at which the hysteresis loop closes is defined as a relative pressure at which the difference between the nitrogen desorption isotherm and the nitrogen adsorption isotherm becomes 10 mL/g or less for the first time.

(1-4. Requirement (D))

The half-width of the G band detected by Raman spectrometry in a range of from 1500 to 1700 $cm^{-1}$ is from 45 to 75 $cm^{-1}$. In this case, the degree of graphitization (crystallinity) of a carbon material as a catalyst support is enhanced. For this reason, the durability (resistance to oxidation exhaustion) is improved. In other words, even when a polymer electrolyte fuel cell using a carbon material as a catalyst support repeats start and stop operations, the carbon material as a catalyst support is resistant to oxidation exhaustion. When the half-width of the G band exceeds 75 $cm^{-1}$, the resistance to oxidation exhaustion of the carbon material as a catalyst support becomes low, and as a result the overvoltage at the time of high current increases. When the half-width of the G band is less than 45 $cm^{-1}$, the pore structure collapses, and as a result some of the requirements (A) to (C), and the requirement (E) described later may be not satisfied.

The lower limit of the half-width of the G band is preferably 50 $cm^{-1}$ or more, and more preferably 55 $cm^{-1}$ or more from the viewpoint of easy supporting of the catalyst, and suppression of reduction in power generation characteristics due to decrease in hydrophilicity.

Meanwhile, the upper limit of the half-width of the G band is preferably 70 $cm^{-1}$ or less, and more preferably 68 $cm^{-1}$ or less from the viewpoint of maintaining the aforedescribed resistance to oxidation exhaustion, and maintaining the mechanical strength of the carbon material as a catalyst support despite decrease in crystallinity.

In this regard, the half-width of the G band is a value measured by the measurement method specified in the examples described later.

(1-5. Requirement (E))

It is preferable that a carbon material as a catalyst support further satisfies the following requirement (E) in addition to the requirements (A) to (D).

(E) The adsorption volume $V_{0.2-0.9}$ measured from the nitrogen adsorption isotherm in a relative pressure range of from 0.20 to 0.90 is from 150 to 700 mL/g. In this regard, the adsorption volume $V_{0.2-0.9}$ is the difference between the nitrogen adsorption amount (mL/g) at a relative pressure of 0.20 and the nitrogen adsorption amount (mL/g) at a relative pressure of 0.90.

This requirement (E) specifies the volume of pores for supporting a fuel cell catalyst. The pore diameter corresponding to the relative pressure of from 0.20 to 0.90 is from about 2 to 20 nm. A fuel cell catalyst is supported in pores having a pore diameter of from 2 to 20 nm. Accordingly, it is preferable that pores having a pore diameter of from 2 to 20 nm are sufficiently distributed in a carbon material as a catalyst support. That is, the adsorption volume $V_{0.2-0.9}$ is preferably from 150 to 700 mL/g. When this requirement (E) is satisfied, a larger amount of a fuel cell catalyst can be supported, and therefore the overvoltage at the time of high current can be further decreased.

When the adsorption volume $V_{0.2-0.9}$ is less than 150 mL/g, the support amount of a fuel cell catalyst decreases, and the overvoltage at the time of high current may be increased. Meanwhile, when the adsorption volume $V_{0.2-0.9}$ exceeds 700 mL/g, the carbon layer that becomes a partition wall between the respective pores becomes thin, and the mechanical strength of a carbon material as a catalyst support may be lowered. As a result, there is a possibility that pores are collapsed in the production step of a fuel cell, and the desired power generation characteristics cannot be obtained.

The lower limit of the adsorption volume $V_{0.2-0.9}$ is preferably 200 mL/g or more, and more preferably 250 mL/g or more from the viewpoint of decrease in overvoltage at the time of high current.

Meanwhile, the upper limit of the adsorption volume $V_{0.2-0.9}$ is 650 mL/g or less, and more preferably 600 mL/g or less from the viewpoint of suppressing decrease in mechanical strength of a carbon material as a catalyst support.

In this regard, the adsorption volume $V_{0.2-0.9}$ is a value measured by the measurement method specified in the examples described later.

<2. Method of Producing Support for a Polymer Electrolyte Fuel Cell Catalyst>

Next, an example of a method of producing a support for a polymer electrolyte fuel cell catalyst (carbon material as a catalyst support) will be described. In the method of producing a carbon material as a catalyst support, an activation treatment using an activation catalyst (a so-called catalyst-based activation treatment) is performed. The method of producing a carbon material as a catalyst support of the present embodiment includes a supporting step, the first heat treatment step, an activation catalyst removal step, and the second heat treatment step. In this regard, the catalyst-based activation treatment is performed in the aforedescribed first heat treatment step.

(2-1. Supporting Step)

In this step, an activation catalyst that promotes an activation reaction on a porous carbon material is supported in pores in the porous carbon material.

Although there is no restriction particularly on a porous carbon material that can be used in the present embodiment, it is preferably, for example, a carbon material to be usable as a catalyst support for a polymer electrolyte fuel cell. Examples of a porous carbon material include Ketjenblack, a dendritic carbon nanostructure (for example, a dendritic carbon nanostructure in which a rod or a ring is three-dimensionally branched to form a three-dimensional dendritic structure), a carbon material which is made porous using template particles (for example, MgO template particles), and a carbon material which is made porous by gas-based activation (for example, $CO_2$ gas-based activation). Examples of the carbon material which is made porous by gas-based activation include Ketjenblack obtained by gas-based activation of carbon black. Among these, Ketjenblack and a dendritic carbon nanostructure are preferable because they have a well-developed dendritic structure, and a dendritic carbon nanostructure is most preferable. A dendritic carbon nanostructure has a well-developed dendritic structure as well as a tetrapod-like structure (for example, a three-dimensional dendritic structure in which a rod or a ring is branched three-dimensionally). For this reason, pores can be formed more efficiently than in Ketjenblack.

With respect to the volume distribution of mesopores of a porous carbon material, specifically, that obtained from the nitrogen gas adsorption measurement result using a BJH analysis, the arithmetic average diameter (of pores having a pore diameter of from 2 to 50 nm) is preferably larger than the particle diameter of an activation catalyst. In this case, a carbon material as a catalyst support that satisfies the aforedescribed requirements (A) through (E) can be produced relatively easily. Therefore, a porous carbon material may be selected according to the particle diameter of an activation catalyst.

Any activation catalyst may be used insofar as it promotes an activation reaction on a porous carbon material. In this regard, an activation reaction means a reaction of wall thinning (in other words, exhaustion) of a carbon layer constituting a porous carbon material by oxidation. An activation catalyst promotes the activation reaction on a carbon layer existing around the activation catalyst.

Examples of an activation catalyst include a particle containing at least one kind out of 3d elements (period 4 transition elements such as Ni, Fe, Co, and Ti), and noble metal elements (such as Ru, Cu, Ag, Pt, and Pd). Among these, a particle containing at least one kind of Ni, Fe, Co, and Pt is preferable. Incidentally, an activation catalyst may be a particle composed of a simple substance of any of the above elements, or an alloy of thereof. For example, an alloy particle of a 3d element and Pt may be used as an activation catalyst.

The reasons why Ni, Fe, and Co are preferable are, for example: (1) the catalytic activity is high, (2) removal after the heat treatment step is easy, and (3) when an alloy with Pt is used as an activation catalyst, the activation catalyst can be redirected as it is to a fuel cell catalyst.

The reasons why Pt is preferable are, for example: (1) Pt used as an activation catalyst can be redirected as it is to a fuel cell catalyst, and (2) Pt can be reduced more easily compared to a 3d element, and a nano-sized particle can be formed easily in porous carbon.

There is no restriction particularly on the method of supporting an activation catalyst in the pores of a porous carbon. Specific examples of the method include the following methods. First, a mixed solution of porous carbon, a salt (or a complex) of an activation catalyst, and a reducing agent is prepared. In this regard, examples of the salt of an activation catalyst include a nitrate of an activation catalyst. Further, examples of the complex of an activation catalyst include an acetylacetonate complex of an activation catalyst. Examples of the reducing agent include a polyol (such as ethylene glycol, triethylene glycol, tetraethylene glycol, poly(ethylene glycol), and hexadecane diol), as well as sodium borohydride, potassium borohydride, lithium borohydride, lithium aluminum hydride, and sodium aluminum hydride. Tetraethylene glycol is a reducing agent, and also functions as a solvent for the mixed solution.

Next, an activation catalyst ion in the mixed solution is reduced by the reducing agent. By doing so, an activation catalyst is deposited as a cluster in the pores of porous carbon. When the activation catalyst particles come into contact with each other, they unite and grow to a larger activation catalyst. As a result, the activation catalyst is supported in the pores of porous carbon. The activation catalyst ion may be reduced in a solvent at a high temperature, and such a treatment is advantageously performed. For example, hexadecanediol is dissolved as a polyol in a high boiling point solvent, such as diphenyl ether, dibenzyl ether, and tetraethylene glycol octyl ether, and the mixed solution is heated to 200° C. or higher. By this treatment, a complex or salt of a 3d element can be also reduced.

There is another method as follows. That is, porous carbon is impregnated with a solution of a salt (or a complex) of an activation catalyst and then dried to produce a coagulated and dried product. Next, this coagulated and dried product is heated in a reducing gas (for example, hydrogen) atmosphere to reduce an activation catalyst is supported in the pores of porous carbon. Hereinafter, porous carbon having supported an activation catalyst is also referred to as a carbon material supporting an activation catalyst.

The distance between activation catalyst particles in a carbon material supporting an activation catalyst varies depending on the support rate of an activation catalyst (the mass % of the activation catalyst with respect to the total mass of porous carbon and the activation catalyst). The shorter the distance between activation catalyst particles is, the smaller the aforedescribed hysteresis loop area $\Delta S_{0.47-0.9}$ becomes. According to the investigation by the present inventors it has been made clear that, when the distance between activation catalyst particles is shortened to about 5 to 7 nm, the hysteresis loop area $\Delta S_{0.47-0.9}$ can be easily regulated in a range of from 1 to 35 mL/g. The support rate of an activation catalyst required for regulating the distance between activation catalyst particles into a range of from about 5 to 7 nm varies depending on the kind of the activation catalyst. For example, in a case in which an activation catalyst is a noble metal element (for example, Pt), the support rate is preferably from 3 to 20% by mass, and more preferably from 10 to 15% by mass. In a case in which an activation catalyst is a 3d element (such as Ni, Fe, and Co), the support rate is preferably from 3 to 9% by mass. In these cases, the distance between activation catalyst particles can be regulated to about 5 to 7 nm. By doing so, the hysteresis loop area $\Delta S_{0.47-0.9}$ can be easily regulated in a range of from 1 to 35 mL/g.

The support rate of an activation catalyst and the distance between activation catalyst particles can be measured by direct observation with an SEM (scanning electron microscope) and a TEM (transmission electron microscope). The support rate of an activation catalyst can be also quantified from the mass of the metal component contained in the reagent. The support rate of an activation catalyst can be adjusted, for example, by regulating the concentration of an activation catalyst in the mixed solution described above.

Although there is no restriction particularly on the particle diameter of an activation catalyst, it is preferably from 2 to 7 nm. By using an activation catalyst having a particle diameter in this range, the minimum diameter of neck parts can be easily adjusted to a range of from 2 to 7 nm. The particle diameter of an activation catalyst can be simply determined by powder X-ray diffractometry, and can be minutely observed with a TEM or SEM. When the particle diameter is measured by powder X-ray diffractometry, a crystallite size is determined based on the half-width of a diffraction peak and a Scherrer equation. The position of a diffraction peak varies depending on the type of X-ray and the kind (metal type) of an activation catalyst. A diffraction peak appears in a range of 2θ=from 39 to 40°, when the CuKα ray is used and an activation catalyst is Pt; and in a range of from 43° to 46°, when an activation catalyst is Fe, Ni, or Co. Since a crystallite of an activation catalyst is a nanoparticle in a size of several nanometers, the crystallite size may be deemed to be equal to the particle size as it is. In other words, the particle diameter is the crystallite size.

Specifically, a particle diameter (the particle diameter of an assumed sphere) is calculated by the Scherrer method based on the line width (the full line width of a diffraction line at half the maximum intensity of the diffraction line) of the diffraction line with the highest intensity among the diffraction lines of an activation catalyst (that is, catalyst metal particles) appeared in powder X-ray diffractometry, and the obtained particle diameter is regarded as the particle diameter of the activation catalyst.

The particle diameter of an activation catalyst can be adjusted by regulating the conditions of the aforedescribed supporting method, the kind of an activation catalyst, the support rate of an activation catalyst, or the like. The particle diameter specified here is the particle diameter of an activation catalyst in a state supported on a porous carbon material before a catalyst-based activation treatment.

When the aforedescribed activation catalyst grows excessively, the particle diameter of the activation catalyst may occasionally exceed 7 nm. Therefore, a protective agent that adheres to the surface of an activation catalyst may be added to the aforedescribed mixed solution. The method of producing fine particles using a protective agent is also called a colloid preparation method. The protective agent is, for example, a ligand that coordinates to a metal composing an activation catalyst. The protective agent adheres to the surface of an activation catalyst. As a result, even when activation catalyst particles come into contact with each other, the activation catalyst particles are less likely to be integrated. That is, it becomes difficult for the activation catalyst particles to grow together. When the particle diameter of an activation catalyst coordinated with a protective agent is too large, it becomes difficult for the activation catalyst to enter the pores of porous carbon. For this reason, it is preferable that the molecular weight of a protective agent is low. Examples of a protective agent include polyvinylpyrrolidone, citric acid (or citrate), oleic acid, oleylamine, gelatin, CMC (carboxymethylcellulose, or a sodium salt thereof).

For example, in a case in which an acetylacetonate complex of nickel is used as a complex of activation catalyst, and tetraethylene glycol as a reducing agent, and the support rate is 3% by mass or less, the particle diameter of the activation catalyst becomes approximately from 2 to 5 nm. While, in a case in which an acetylacetonate complex of nickel is used as a complex of activation catalyst, sodium borohydride as a reducing agent, and oleic acid and citric acid as a protective agent, the particle diameter of activation catalyst becomes approximately 7 nm regardless of the support rate. Also, in the method of preparing a coagulated and dried product containing nickel nitrate as a coagulated and dried product, in a case in which the support rate is 3% by mass, the particle diameter of an activation catalyst becomes approximately 5 nm.

(2-2. First Heat Treatment Step)

In the first heat treatment step, a carbon material supporting an activation catalyst is heat-treated in a range of from 300° C. to 700° C. in an oxygen-containing atmosphere. This causes an activation reaction. That is, a carbon layer existing around the activation catalyst is thinned by oxidation.

A carbon material prepared by the first heat treatment step (that is, a carbon material having undergone catalyst-based activation) satisfies the aforedescribed requirements of (A) to (C) (preferably satisfies the requirements of (A) to (C) and (E)). In other words, the minimum diameter of neck parts is increased, and the volume ratio of bottleneck pores is decreased. The inventors conceive that an activation catalyst has selectively reduced the wall thickness at a neck part, which enlarges the minimum diameter of neck parts, and decreases the volume ratio of bottleneck pores. That is, when the wall thickness at a neck part is selectively reduced, a bottleneck pore comes to have a nearly cylindrical shape. This increases the minimum diameter of neck parts. In addition, since a bottleneck pore has now a shape nearly cylindrical, the pore is no longer a bottleneck pore. Therefore, the volume ratio of bottleneck pores decreases.

It is preferable that the oxygen concentration of the aforedescribed oxygen-containing atmosphere is from 5 to 100% by volume with respect to the total volume of the atmosphere gas. Specifically, the oxygen-containing atmosphere is preferably a mixed gas atmosphere of oxygen and an inert gas. The oxygen concentration is preferably from 5 to 100% by volume with respect to the total volume of the mixed gas. When the oxygen concentration is less than 5% by volume, it is possible that an activation reaction does not proceed sufficiently.

It is preferable that the mixed gas is flowing. The linear velocity at this point is preferably about from 1 mm/min to 30 cm/min. When the linear velocity is less than 1 mm/min, there is a possibility that the supply amount of an oxygen gas is insufficient, and an activation reaction does not proceed sufficiently. When the linear velocity exceeds 30 cm/min, the mixed gas takes heat from a carbon material supporting an activation catalyst, and an activation reaction may occur unevenly.

When the temperature of the heat treatment is less than 300° C., an activation reaction may not proceed sufficiently. When the temperature of the heat treatment exceeds 700° C., an activation reaction proceeds excessively, and the mechanical strength of the product, namely a carbon material having undergone catalyst-based activation, may be decreased, or the durability, etc. may be decreased.

The heat treatment time is preferably from about 20 min to 20 hours. When the heat treatment time is less than 20 min, there is a possibility that the selective wall thinning at the neck part does not proceed sufficiently. As a result, the minimum diameter of neck parts may not be sufficiently enlarged. Meanwhile, when the heat treatment time exceeds 20 hours, the production cost of a carbon material as a catalyst support becomes too high. In addition, when the concentration of an oxygen gas becomes lower, it is necessary to lengthen accordingly the heat treatment time.

A gas-based activation method is also known as a method of activating a porous carbon material. When the inventors tried a gas-based activation method, a carbon material as a catalyst support according to this embodiment could not be produced.

A reason for this is that the thickness of a carbon layer is uniformly reduced by the gas-based activation method.

For example, in a gas-based activation method using water vapor, carbon dioxide gas, or the like, the treatment is generally carried out at a temperature of 900° C. or higher, however since the oxidizing power is weak, only the edges of the carbon hexagonal plane (condensed polycyclic aromatic) are exhausted by oxidation, so that the thicknesses at the neck part and the bottle part of a bottleneck pore are uniformly reduced. As a result, the area of the hysteresis loop is rather increased.

Further, for example, in a gas-based activation method using oxygen, air, or the like, the treatment is generally performed in a range of from 300° C. to 700° C. However, since the oxidizing power is strong, not only at the edges of a carbon hexagonal plane, but also in the inner part oxidation origins appear to advance exhaustion. As a result, a new hole is formed in the bottle part to develop networking to connect pores each other. For this reason, the area of the hysteresis loop is reduced. However, in the case of oxygen gas-based activation, it is necessary to increase the wall thinning rate to 50% or more for obtaining the effect of reducing the area of the hysteresis loop.

Universally the gas-based activation method is an activation method by which the edges of a carbon hexagonal plane are exhausted by oxidation, or a small pore is opened in the carbon hexagonal plane itself, and therefore the minimum neck diameter itself cannot be increased. Consequently, the relative pressure $P_{close}/P_0$ at which the hysteresis loop closes becomes 0.47 or less.

(2-3. Activation Catalyst Removal Step)

An activation catalyst remains in a carbon material having undergone catalyst-based activation prepared in the first heat treatment step. When an activation catalyst cannot be redirected to a fuel cell catalyst, the catalyst-based activation is removed in this step from the carbon material having undergone catalyst-based activation. Although there is no restriction particularly on the method of removing an activation catalyst, examples thereof include a method by which a carbon material having undergone catalyst-based activation is immersed in an acidic solution (for example, nitric acid aqueous solution).

(2-4. Second Heat Treatment Step)

In the second heat treatment step, a carbon material having undergone catalyst-based activation is heated in a range of from 1400 to 2200° C. in vacuum or in an inert gas atmosphere. The heating temperature is preferably from 1600 to 2100° C. The crystallinity of a carbon material having undergone catalyst-based activation can be increased in the second heat treatment step. That is, a carbon material having undergone catalyst-based activation satisfying the aforedescribed requirement (D) can be produced. When the heating temperature in this second heating step is lower than 1400° C., the crystallinity of a carbon material having undergone catalyst-based activation is not improved, and there is a risk that the durability in the service environment of a fuel cell is not secured. In other words, there is a risk that the requirement (D) is not satisfied. Also, when the heating temperature exceeds 2200° C., the pore structure may collapse, and as a result, some of the requirements (A) to (C), and (E) are possibly not satisfied.

The heating time at the second heat treatment step is preferably from 10 min to 10 hours, and more preferably from 20 min to 5 hours from the viewpoints of enhancing the crystallinity of a carbon material having undergone catalyst-based activation, and satisfying any of the requirements (A) to (C), and (E).

There is no restriction particularly on the method of heating a carbon material having undergone catalyst-based activation, insofar as it is a method capable of heating a carbon material having undergone catalyst-based activation at the aforedescribed temperature. Examples of the heating method include resistance heating, microwave heating, high-frequency heating, and a furnace-type heating method. There is also no restriction particularly on the furnace-type, insofar as an inert or reduced pressure atmosphere can be achieved, and examples include a graphitizing furnace, a batch-wise furnace, and a tunnel furnace. Through the aforedescribed steps, a carbon material as a catalyst support according to the present embodiment is produced.

The second heat treatment step may be also performed before the first heat treatment step, or may be performed after the first heat treatment step. In other words, it is necessary that the second heat treatment step should be performed at least once before or after the first heat treatment step.

As described above, with respect to a carbon material as a catalyst support of the present embodiment (that is, a support for a polymer electrolyte fuel cell catalyst), the minimum diameter of neck parts is increased, and the volume ratio of bottleneck pores is decreased. Therefore, the gas diffusion resistance of the catalyst layer is lowered, and the occurrence of flooding can be suppressed. Therefore, the overvoltage at the time of high current is further decreased. Further, since the carbon material as a catalyst support of the present embodiment (that is, a support for a polymer electrolyte fuel cell catalyst) has high crystallinity, the durability of a carbon material is also improved.

<3. Structure of Polymer Electrolyte Fuel Cell>

A carbon material as a catalyst support of the present embodiment can be applied to, for example, a polymer electrolyte fuel cell 100 shown in FIG. 4. The polymer electrolyte fuel cell 100 is provided with separators 110 and 120, gas diffusion layers 130 and 140, catalyst layers 150 and 160, and an electrolyte membrane 170.

The separator 110 is an anode-side separator, and introduces a fuel gas such as hydrogen into the gas diffusion layer 130. The separator 120 is a cathode-side separator, and introduces an oxidizing gas such as an oxygen gas, or air into a gas diffusion condensation phase. The kind of separators 110 and 120 is not particularly limited, and may be a separator used in a conventional fuel cell, such as a polymer electrolyte fuel cell.

The gas diffusion layer 130 is a gas diffusion layer on the anode side, and diffuses the fuel gas supplied from the separator 110, and then supplies it to the catalyst layer 150. The gas diffusion layer 140 is a gas diffusion layer on the cathode side, and diffuses the oxidizing gas supplied from the separator 120, and then supplies it to the catalyst layer 160. There is no restriction particularly on the kind of gas diffusion layers 130 and 140, and a gas diffusion layer used in a conventional fuel cell such as a polymer electrolyte fuel cell may be used. Examples of the gas diffusion layers 130 and 140 include a porous carbon material (such as carbon cloth, and carbon paper), a porous metal material (such as metal mesh, and metal wool).

Preferable examples of the gas diffusion layers 130 and 140 include a gas diffusion layer having a two-layer structure, in which a separator-side layer of a gas diffusion layer is a gas diffusing fiber layer composed mainly of a fibrous carbon material, and a catalyst layer-side layer is a micropore layer mainly composed of carbon black.

The catalyst layer 150 is a so-called anode. In the catalyst layer 150, an oxidation reaction of the fuel gas occurs, and protons and electrons are generated. For example, when the fuel gas is a hydrogen gas, the following oxidation reaction occurs.

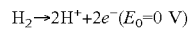

$$H_2 \rightarrow 2H^+ + 2e^- (E_0 = 0 \text{ V})$$

Protons generated by the oxidation reaction reach the catalyst layer 160 through the catalyst layer 150 and the electrolyte membrane 170. Electrons generated by the oxidation reaction reach an external circuit through the catalyst layer 150, the gas diffusion layer 130, and the separator 110. The electrons are introduced into the separator 120 after working in the external circuit. Thereafter, the electrons reach the catalyst layer 160 through the separator 120, and the gas diffusion layer 140.

The structure of the catalyst layer 150 to serve as the anode is not particularly restricted. That is, the structure of the catalyst layer 150 may be the same as that of the conventional anode, the same as that of the catalyst layer 160, or a structure having higher hydrophilicity than the catalyst layer 160.

The catalyst layer 160 is a so-called cathode. In the catalyst layer 160, a reduction reaction of an oxidizing gas occurs, and water is generated. For example, when the oxidizing gas is an oxygen gas or air, the following reduction reaction occurs. The water generated by the oxidation reaction is discharged outside the polymer electrolyte fuel cell 100 together with an unreacted oxidizing gas.

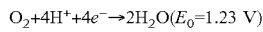

$O_2 + 4H^+ + 4e^- \rightarrow 2H_2O (E_0 = 1.23 \text{ V})$

As described above, in the polymer electrolyte fuel cell 100, electric power is generated utilizing the energy difference between the oxidation reaction and the reduction reaction (electric potential difference). In other words, the electrons generated by the oxidation reaction work in an external circuit.

The catalyst layer 160 preferably includes a carbon material as a catalyst support of the present embodiment. That is, the catalyst layer 160 includes a carbon material as a catalyst support of the present embodiment, an electrolyte material, and a fuel cell catalyst. In that way, the catalyst utilization rate in the catalyst layer 160 can be increased. As a result, the catalyst utilization rate of the polymer electrolyte fuel cell 100 can be increased.

Although there is no restriction particularly on the support rate of fuel cell catalyst in the catalyst layer 160, it is preferably 30% by mass or more, and less than 80% by mass. In this regard, a support rate of a fuel cell catalyst is preferably defined as the mass percentage of a fuel cell catalyst with respect to the total mass of particles supporting catalyst (particles of a carbon material as a catalyst support having supported a fuel cell catalyst). In the above case, the catalyst utilization rate is further increased. When the support rate of fuel cell catalyst is less than 30% by mass, it may become necessary to increase the thickness of the catalyst layer 160 so that the polymer electrolyte fuel cell 100 can withstand the practical use. Meanwhile, when the support rate of fuel cell catalyst is 80% by mass or more, catalyst aggregation tends to occur. In addition, the catalyst layer 160 becomes too thin, and flooding may occur.

Although there is no restriction particularly on the mass ratio I/C of the mass I (g) of an electrolyte material to the mass C (g) of a carbon material as a catalyst support in the catalyst layer 160, it is preferably more than 0.5, and less than 5.0. In this case, the network of pores and the network of the electrolyte material can be compatible, and the catalyst utilization rate is increased. On the other hand, when the mass ratio I/C is 0.5 or less, the network of the electrolyte material tends to be poor, and the proton conduction resistance tends to increase. When the mass ratio I/C is 5.0 or more, the network of pores may be broken by the electrolyte material. In both cases, the catalyst utilization rate may be decreased.

Although there is no restriction particularly on the thickness of the catalyst layer 160, it is preferably more than 5 μm, and less than 20 μm. In this case, an oxidizing gas easily diffuses in the catalyst layer 160, and flooding is less likely to occur. When the thickness of the catalyst layer 160 is 5 μm or less, flooding is likely to occur. When the thickness of the catalyst layer 160 is 20 μm or more, it becomes difficult for the oxidizing gas to diffuse in the catalyst layer 160, and for the fuel cell catalyst in the vicinity of the electrolyte membrane 170 to work. That is, the catalyst utilization rate may be reduced.

The electrolyte membrane 170 is composed of an electrolyte material having proton conductivity. The electrolyte membrane 170 introduces protons generated by the above oxidation reaction into the catalyst layer 160 serving as a cathode. There is no restriction particularly on the kind of electrolyte material insofar as it is an electrolyte material usable in a conventional fuel cell such as a polymer electrolyte fuel cell. Preferable examples include an electrolyte material used in a polymer electrolyte fuel cell, namely an electrolyte resin. Examples of an electrolyte resin include a polymer in which a phosphoric acid group, a sulfonic acid group, or the like has been introduced (such as a perfluorosulfonic acid polymer, or a polymer having introduced a benzenesulfonic acid). Naturally, the electrolyte material according to the present embodiment may be another kind of electrolyte material. Examples of such an electrolyte material include an electrolyte material of an inorganic type, and of an inorganic-organic hybrid type. The polymer electrolyte fuel cell 100 may be a fuel cell that works in a range of room temperature to 150° C.

<4. Method of Producing Polymer Electrolyte Fuel Cell>

There is no restriction particularly on the method of producing the polymer electrolyte fuel cell 100, and a production method similar to the conventional one may be used. However, it is preferable to use a carbon material as a catalyst support of the present embodiment as the catalyst support on the cathode side.

EXAMPLES

<1. Method of Measuring Each Parameter>

Next, the examples of the present embodiment will be described. First, a method of measuring each parameter will be described.

(1-1. Method of Measuring Nitrogen Adsorption and Desorption Isotherm)

Approximately 30 mg of a sample was weighed and vacuum dried at 120° C. for 2 hours. Next, the sample was set on an automatic specific surface area measuring device (BELSORP MAX, manufactured by MicrotracBEL Corp.) and a nitrogen adsorption and desorption isotherm was measured using a nitrogen gas as the adsorbate at a measurement temperature of 77 K.

In measuring a nitrogen adsorption and desorption isotherm, measurement intervals of the relative pressure $P/P_0$ were set smaller than general measurements (specifically, measurement fixed points were set such that the intervals of $P/P_0$ became 0.005). That is, the measurement accuracy of the relative pressure $P/P_0$ in the measurement was set at 0.005.

Next, a BET specific surface area was calculated by performing a BET analysis of a nitrogen adsorption isotherm in the range of relative pressure $P/P_0$ of from 0.05 to 0.15.

Further, the area $\Delta S_{0.47\text{-}0.9}$ of a hysteresis loop formed in a range of relative pressure $P/P_0$ of more than 0.47 but not more than 0.9 was calculated.

Specifically, the calculation of the hysteresis loop area $\Delta S_{0.47-0.9}$ was performed by the following method. That is, the difference $\Delta V$ between the adsorption amounts V of the adsorption process and the release process at each measurement point with respect to the relative pressure $P/P_0$ was multiplied with 0.005 which is the measurement interval with respect to the relative pressure $P/P_0$, and the product was integrated with respect to all the measurement points in a range of relative pressure $P/P_0$ of more than 0.47 but not more than 0.9. The calculated integrated value was regarded as $\Delta S_{0.47-0.9}$.

When the difference $\Delta P$ (see FIG. 6) between the adsorption amount of the nitrogen desorption isotherm and the adsorption amount of the nitrogen adsorption isotherm becomes less than 10 mL/g at a relative pressure $P/P_0$ for the first time in the course of measuring the nitrogen desorption isotherm, this relative pressure $P/P_0$ was regarded as the relative pressure $P_{close}/P_0$ at which the hysteresis loop closes. Also, the difference between the nitrogen adsorption amount (mL/g) at a relative pressure of 0.20 and the nitrogen adsorption amount (mL/g) at a relative pressure 0.90 was defined as the adsorption volume $V_{0.2-0.9}$.

(1-2. Method of Measuring Raman Spectrum)

Approximately 3 mg of a sample was weighed, and Raman spectroscopy was performed on the sample using a laser Raman spectrophotometer (NRS-3100 model, manufactured by Jasco Corporation) under measurement conditions of: excitation laser: 532 nm, laser power: 10 mW (sample irradiation power: 1.1 mW), microscopic arrangement: objective lens: 100×, spot diameter: 1 exposure time: 30 sec, observation wave number: 2000 to 300 cm$^{-1}$, number of integration: 6. From each Raman spectrum obtained by the measurement, a peak in a range of from 1500 to 1700 cm$^{-1}$ called G band was extracted, and the half-width ($\Delta G$) of this peak was measured. The results are summarized in Table 2.

(1-3. Method of Measuring Particle Diameter of Activation Catalyst)

An X-ray diffraction spectrum of a carbon material after supporting an activation catalyst was measured using a powder X-ray diffractometer (SMARTLAB manufactured by Rigaku Corporation). From this, the particle diameter of an activation catalyst was measured. By this method, the particle diameters of all kinds of activation catalysts used in the present test were measured. As the X-ray, the CuKα ray was used.

The crystallite size of an activation catalyst was calculated using the half-width and the Scherrer equation with respect to a diffraction peak appearing near 2θ=39° when the activation catalyst is Pt, or appearing between 43° and 46° when the activation catalyst is Fe, Ni, or Co. In both cases, the activation catalysts were nanoparticles in a size of several nanometers. Therefore, the crystallite size was deemed to be a particle size as it was, and the crystallite size was defined as the diameter of a catalyst particle.

<2. Preparation of Carbon Material as a Catalyst Support>

A plurality of kinds of carbon materials as a catalyst support were produced under different production conditions for each of Experiment numbers Run-0 to 46. Specifically, a plurality of kinds of carbon materials as a catalyst support were produced by performing the following steps.

(2-1. Preparation of Porous Carbon Material)

A porous carbon material used as a starting material for a carbon material as a catalyst support was prepared by the following step.

(2-1-1) A porous carbon material (porous carbon black, activated CB-1) was obtained by heat-treating TOKABLACK #4500 produced by Tokai Carbon Co., Ltd. in a carbon dioxide stream at a temperature of 780° C. for 50 hours. Further, a porous carbon material (porous carbon black, activated CB-2) was obtained by heat-treating TOKABLACK #4500 produced by Tokai Carbon Co., Ltd. in a carbon dioxide stream at 810° C. for 60 hours.

(2-1-2) A material was prepared by heat-treating EC600JD produced by Lion Corporation in the following step. A graphite crucible containing 10 g of EC600JD was placed in a graphitizing furnace manufactured by Shinsei Denro Seisakusho. Next, the inside of the graphitizing furnace was vacuumed and replaced with an argon gas. Subsequently, the internal temperature of the graphitizing furnace was raised to 1800° C. at 10° C./min flowing an argon gas at a flow rate of 5 L/min, and this state was maintained for 2 hours. Thus, a porous carbon material (EC-1800) having a crystallinity higher than that of EC600JD was prepared.

(2-1-3) A porous carbon material (SC-2100) was obtained by performing the same treatment as the activated CB-1 in (2-1-1) above, except that ESCARBON produced by Nippon Steel & Sumikin Chemical Co., Ltd. was used, and the heat treatment temperature was changed to 2100° C.

(2-1-4) A porous carbon material (MH-1800) was obtained by performing the same step as in (2-1-2) above, except that CNOVEL MH (trade name) produced by Toyo Tanso Co., Ltd. was used.

(2-2. Supporting Step)

A carbon material supporting an activation catalyst was produced by performing one of the following three supporting steps A to C according to the conditions set forth in Table 1.

(2-2-1. Supporting Step A)

A porous carbon material was dispersed in 200 mL of tetraethylene glycol (Kanto Chemical Co., Ltd., G R. grade, the same holds hereinafter). Subsequently, the dispersion of porous carbon material was heated and held at 150° C. with a mantle heater in an argon gas stream. Then, a tetraethylene glycol solution of nickel acetylacetonate (produced by Tokyo Chemical Industry Co., Ltd.) prepared in advance was poured into the dispersion. Thereafter, the mixture liquid was kept at a temperature of 200° C. for about 1 hour. Next, the mixture liquid was cooled to 80° C. or lower in an argon stream. Next, the mixture liquid was filtrated with a membrane filter, and the solid matter on the filter was vacuum-dried at 120° C. for several hours. Thus, a carbon material supporting an activation catalyst was prepared. In doing so, the mass of a porous carbon material added to tetraethylene glycol was adjusted within a range of from 0.2 to 1.0 g, and the concentration of the tetraethylene glycol solution of nickel acetylacetonate (produced by Tokyo Chemical Industry Co., Ltd.) was adjusted in a range of from 0.5 to 10% by mass, so that carbon materials supporting an activation catalyst having a different support rate of an activation catalyst (in this case nickel particles) and particle diameter were prepared. In this regard, a support rate may be calculated from the supplied amount of the reagents simply and quickly for time saving, although the same value is obtained by an elemental analysis of the aforedescribed carbon material having supported an activated catalyst metal used in the synthesis. The particle diameter of an activation catalyst was measured by the aforedescribed method, that is, based on the half-width of the peak of the metal component from XRD. The kind of activation catalyst, supporting method, support rate, and particle diameter are summarized in Table 1.

Meanwhile, in the supporting step A, nickel acetylacetonate was replaced with iron acetylacetonate, cobalt acetylacetonate, or platinum acetylacetonate depending on the kind of activation catalyst, and the same treatment was performed.

(2-2-2. Supporting Step B)

The same treatment as in the supporting step A was performed, except that the retention temperature after adding the tetraethylene glycol solution of nickel acetylacetonate (produced by Tokyo Chemical Industry Co., Ltd.) in the supporting step A was changed to 300° C.

(2-2-3. Supporting Step C)

The same treatment as in the supporting step A was performed, except that the acetylacetonate as the activation catalyst in the supporting step A was changed to a nitrate hydrate as the activation catalyst, and citric acid was added to the mixture liquid such that the molar ratio thereof to the activation catalyst became 5 times as much.

(2-3. First Heat Treatment Step)

A carbon material supporting an activation catalyst was activated by performing the first heat treatment step. Specifically, 1.5 g of a carbon material supporting an activation catalyst was placed in an alumina boat, which was then set in a horizontal electric furnace. Subsequently, a mixed gas of oxygen and argon was allowed to flow through the electric furnace. The linear velocity of the mixed gas was 1 cm/min. The flow amount ratio of oxygen to argon in the mixed gas, namely the oxygen concentration in the mixed gas was adjusted in a range of from 5 to 80% by volume. Subsequently, the temperature inside the electric furnace (treatment temperature) was adjusted in a range of from 250 to 800° C. Furthermore, the treatment time was adjusted in a range of from 0.2 hour to 18 hours while controlling the weight loss. By this step, a carbon material having undergone catalyst-based activation was produced.

(2-4. Activation Catalyst Removal Step)

The activation catalyst was removed from a carbon material having undergone catalyst-based activation by implementing this step. Specifically, a 5 mass % aqueous solution of nitric acid was prepared, and a carbon material having undergone catalyst-based activation was dispersed in this nitric acid aqueous solution. Then, the dispersion was stirred for 10 hours while maintaining it at 60° C. As a result, the activation catalyst was dissolved in the nitric acid aqueous solution. Next, the dispersion was filtrated with a membrane filter, and the solid matter remaining on the filter was dispersed again in distilled water. Subsequently, the dispersion was filtrated again with a membrane filter, and the solid matter remaining on the filter was vacuum-dried at 110° C. In this way, the activation catalyst was removed from the carbon material having undergone catalyst-based activation.

In Experiment numbers Run-28 to 32, 38, and 39, this step was omitted. That is, in Run-28 to 32, Pt as an activation catalyst was further subjected to a platinum supporting treatment described later to attain a predetermined platinum supported amount; and in Run-38 and 39, Co as an activation catalyst was further subjected to a platinum supporting treatment to attain a predetermined platinum supported amount by a platinum supporting treatment described later, then subjected to a treatment for alloying described later, and used as a fuel cell catalyst.

(2-5. Second Heat Treatment Step)

In the producing process of Experiment numbers Run-33 to 37, the second heat treatment step was performed. Specifically, the inside of the graphitizing furnace was vacuumed and replaced with an argon gas. Subsequently, the activated CB-2 was treated at 1800° C. (Run-33, 34, and 37) flowing an argon gas in the graphitizing furnace at a flow rate of 5 L/min. This treatment was aimed at enhancement of the crystallinity and the durability after a catalyst-based activation treatment.

In Run-33, 34, and 37, a catalyst-based activation treatment was performed after the second heat treatment. The conditions were as shown in Table 1. In Run-37 again the aforedescribed process in which the treatment temperature was set at 2100° C. was performed again after the catalyst-based activation treatment. The heat treatment time was 1 hour in all cases.

In Run-35 and 36, a heat treatment at 1800° C. (Run-35) or 1900° C. (Run-36), respectively, was performed for 1 hour after the catalyst-based activation treatment. This increased the degree of graphitization (crystallinity) of a carbon material having undergone catalyst-based activation.

Through the above steps, carbon materials as a catalyst support of Experiment numbers Run-0 to 43, and 45 to 46 were produced.

Further, the activated CB-1 was activated with water vapor (gas-based activation with water vapor) to prepare a carbon material as a catalyst support having a higher degree of activation (activated CB-1-$H_2O$, Experiment number Run-44). As for activation conditions, an argon gas was bubbled in a water bath at 90° C. to prepare an argon gas containing water vapor, and under the circulation of which a heat treatment was performed at 800° C. for 3 hours.

In addition, by conducting air-based activation (gas-based activation with air) on the porous carbon material (MH-1800), a porous carbon material (MH-1800-Air 540, Experiment number Run-45), and a porous carbon material (MH-1800-Air 570, Experiment number Run-46) having enhanced degree of communication were prepared as follows. The porous carbon material (MH-1800) was heat-treated in air (air-based activation) to consume carbon by oxidation. Specifically, the porous carbon material (MH-1800) was treated in an air stream at 40° C. for 1 hour to obtain a porous carbon material (MH-1800-Air 540), or at 570° C. for 1 hour to obtain a porous carbon material (MH-1800-Air 570).

The production conditions for producing carbon materials as a catalyst support are summarized in Table 1, and the physical properties are summarized in Table 2.

<3. Production of MEA>

An MEA (membrane electrode assembly) was prepared by the following step using a carbon material as a catalyst support prepared above.

(3-1. Platinum Supporting Treatment)

A carbon material dispersion was prepared by dispersing a carbon material as a catalyst support in distilled water. Next, formaldehyde was added to this carbon material dispersion, which was then placed in a water bath set at 40° C. Then after waiting till the temperature of the carbon material dispersion reached 40° C. which was the same as the bath temperature, an aqueous nitric acid solution of dinitrodiamine Pt complex was slowly poured into the carbon material dispersion while stirring the dispersion. After continuing stirring for about 2 hours, the carbon material dispersion was filtrated, and the collected solid was washed. The thus obtained solid was vacuum-dried at 90° C. and then pulverized in a mortar. Then, the solid was heat-treated at 200° C. for 1 hour in an argon atmosphere containing hydrogen at 5% by volume. In this way, a carbon material supporting platinum was produced. Platinum in the carbon material supporting platinum serves as a fuel cell catalyst. In Experiment numbers Run-38 and 39, the platinum supporting treatment was performed on a carbon material in which Co as the activation treatment catalyst remained. Further, the carbon material was heat-treated at 700° C. for 30 min in an argon stream containing hydrogen at 10% by volume for the purpose of alloying the supported Co and Pt. A carbon material obtained in this step is hereinafter also referred to as "carbon material supporting a catalyst".

The amount of platinum supported on the carbon material supporting a catalyst was aimed at 40% by mass with respect to the total mass of the carbon material as a catalyst support and platinum particles. In Experiment number Run-38, the supported amount of platinum was aimed at 41.5% by mass, and the supported amount of Co was aimed at 6.9% by mass. In Experiment number Run-39, the supported amount of platinum was aimed at 42.0% by mass, and the supported amount of Co was aimed at 8.1% by mass. The supported amounts of platinum and Co were confirmed by inductively coupled plasma-atomic emission spectrometry (ICP-AES).

(3-2. Preparation of Coating Ink)

A Nafion solution in which Nafion® (persulfonic acid ion exchange resin, produced by E.I. du Pont de Nemours and Company) was dissolved as an electrolyte resin, was prepared. Next, a carbon material supporting a catalyst and the Nafion solution were mixed in an argon atmosphere. The mass ratio of the solid content of the electrolyte resin to the carbon material supporting a catalyst was set at 1.0. Next, after gently stirring the mixed solution, the carbon material supporting a catalyst in the mixed solution was disintegrated with ultrasonic waves. Next, the total solid concentration of the carbon material supporting a catalyst and the electrolyte resin was adjusted to 1.0% by mass with respect to the total mass of the mixture by adding ethanol to the mixed solution. In this way, a coating ink containing a carbon material supporting a catalyst and an electrolyte resin was prepared.

(3-3. Preparation of Catalyst Layer)

By adding more ethanol to the coating ink, the catalyst concentration (concentration of fuel cell catalyst) in the coating ink was adjusted to 1.0% by mass with respect to the total mass of the coating ink. Although the kind of fuel cell catalyst is different for each Run, it is one or more of platinum, Co, and alloys thereof. The concentration of the fuel cell catalyst means the concentration of all of these components. The same applies to a weight per unit area described later. Next, the spray conditions were adjusted such that the weight of a fuel cell catalyst per unit area of the catalyst layer (hereinafter referred to as "catalyst coating weight") became 0.2 mg/cm$^2$, and the coating ink was sprayed on a Teflon® sheet. Subsequently, a catalyst layer was produced by performing a drying treatment at 120° C. for 60 min in an argon atmosphere. Two identical catalyst layers were prepared, and one was used as a cathode and the other was used as an anode.

(3-4. Production of MEA)

A square electrolyte membrane with a side of 6 cm was cut out from a Nafion membrane (NR211, produced by E.I. du Pont de Nemours and Company). In addition, each of the anode catalyst layer and the cathode catalyst layer coated on the Teflon® sheet was cut into a square shape having a side of 2.5 cm with a knife. The electrolyte membrane was interposed between the thus cut out anode catalyst layer and cathode catalyst layer such that both the catalyst layers sandwiched the central part of the electrolyte membrane in direct contact therewith and without misalignment with each other, and pressing at 120° C. and 100 kg/cm$^2$ was carried out for 10 min. Then, the laminate was cooled to room temperature. Thereafter, the Teflon® sheets were peeled off carefully from the anode and the cathode. Through the above steps, both the anode and cathode catalyst layers were fixed to the electrolyte membrane.

Next, two square carbon paper sheets having a side of 2.5 cm were cut out from carbon paper (35BC, produced by SGL Carbon SE) to serve as a gas diffusion layer. Subsequently, the carbon paper sheets were laminated avoiding misalignment between the anode and the cathode to produce a laminate. Subsequently, MEA was produced by pressing the laminate at 120° C. and 50 kg/cm$^2$ for 10 min. From the difference between the weight of the Teflon® sheet with a catalyst layer before pressing, and the mass of the Teflon® sheet peeled off after pressing, the mass of the catalyst layer fixed on the Nafion membrane was determined, and from the mass ratio of components of the catalyst layer, the catalyst coating weight, the weight of a carbon material as a catalyst support per unit area, and the weight of an electrolyte resin per unit area were calculated. By this method, it was confirmed that the catalyst coating weight was 0.2 mg/cm$^2$.

<4. Performance Evaluation Test>

Each of the prepared MEAs was assembled in a cell, and the performance of the fuel cell was evaluated using a fuel cell measurement device.

(4-1. Characteristics at High Current)

Air was supplied to the cathode, and pure hydrogen was supplied to the anode under the atmospheric pressure such that their utilization rates became 40% and 70%, respectively. The cell temperature was set at 80° C. Further, the air and pure hydrogen supplied to the fuel cell were humidified respectively by making them pass through distilled water (that is, by bubbling) kept at 65° C. in a humidifier. In other words, water vapor equivalent to that in reformed hydrogen was included in these gases. The humidified gases were supplied to the cell. After supplying gases to the cell under these conditions, the load was gradually increased, and the voltage between the cell terminals at 1000 mA/cm$^2$ was recorded as the output voltage, and the characteristics at high current of the fuel cell were evaluated.

The obtained evaluation results on characteristics at high current of the fuel cell was rated according to the output voltage, to the effect that ranks A, B, and C are acceptable, but rank D is not acceptable. Among the acceptable ranks, rank C is marginally acceptable, rank B means higher performance, and rank A means still higher performance. Specifically, with respect to acceptable ranks A, B, and C, the output voltages at 1000 mA/cm$^2$ were 0.60 V or more, 0.63 V or more, and 0.65 V or more, respectively. With respect to the unacceptable rank D, the same was below the criterion for the acceptable rank C. The evaluation results (denoted as "output before durability test" in the table) are summarized in Table 2.

(4-2. Durability)

In the above cell, the hydrogen gas supplied to the anode was maintained as it was, and an argon gas humidified under the same humidifying conditions as in 4-1 described above was supplied to the cathode. In this state, a rectangular voltage variation cycle in which the cell voltage was kept at 1.0 V for 4 sec, and then at 1.3 V for 4 sec was repeated for 4000 cycles as a durability test. Thereafter, the same test as in 4-1 was conducted to evaluate the characteristics at high current after the durability test. The evaluation results (denoted as "output after durability test" in the table) are summarized in Table 2.

As the characteristics at high current after the durability test, not the reduction rate from the characteristics at high current before the durability test, but the absolute value of the voltage was adopted. This is because the surface property of the cathode becomes hydrophilic after the durability test, and therefore it is sometimes possible that the characteristics at high current after the durability test are even improved.

TABLE 1

| | | Conditions for activating catalyst | | | | | | |
|---|---|---|---|---|---|---|---|---|
| Experiment number | Source carbon material | Kind of activation catalyst | Supporting method | Support rate mass % | Particle diameter nm | Oxygen concentration volume % | Treatment temperature °C | Treatment time hr |
| Run-0 | Activated CB-1 | — | — | — | — | — | — | — |
| Run-1 | Activated CB-1 | Ni | A | 1 | 1.9 | 20 | 400 | 3 |
| Run-2 | Activated CB-1 | Ni | A | 2 | 1.8 | 20 | 400 | 3 |
| Run-3 | Activated CB-1 | Ni | A | 3 | 2.1 | 20 | 400 | 3 |
| Run-4 | Activated CB-1 | Ni | A | 5 | 3.6 | 20 | 400 | 3 |
| Run-5 | Activated CB-1 | Ni | A | 7 | 5.8 | 20 | 400 | 3 |
| Run-6 | Activated CB-1 | Ni | A | 9 | 6.9 | 20 | 400 | 3 |
| Run-7 | Activated CB-1 | Ni | A | 11 | 8.5 | 20 | 400 | 3 |
| Run-8 | Activated CB-1 | Ni | A | 6 | 4.3 | 20 | 250 | 3 |
| Run-9 | Activated CB-1 | Ni | A | 6 | 4.3 | 20 | 300 | 3 |
| Run-10 | Activated CB-1 | Ni | A | 6 | 4.3 | 20 | 500 | 3 |
| Run-11 | Activated CB-1 | Ni | A | 6 | 4.3 | 20 | 600 | 3 |
| Run-12 | Activated CB-1 | Ni | A | 6 | 4.3 | 20 | 700 | 3 |
| Run-13 | Activated CB-1 | Ni | A | 6 | 4.3 | 20 | 800 | 3 |
| Run-14 | Activated CB-1 | Ni | A | 5 | 3.6 | 5 | 350 | 18 |
| Run-15 | Activated CB-1 | Ni | A | 5 | 3.6 | 80 | 500 | 0.2 |
| Run-16 | Activated CB-1 | Ni | A | 5 | 3.6 | 80 | 500 | 0.4 |
| Run-17 | Activated CB-1 | Ni | B | 3 | 5.1 | 40 | 400 | 4 |
| Run-18 | Activated CB-1 | Ni | C | 4 | 6.5 | 50 | 400 | 5 |
| Run-19 | Activated CB-2 | Fe | A | 4 | 5.2 | 30 | 450 | 4 |
| Run-20 | Activated CB-2 | Fe | A | 6 | 7.2 | 30 | 450 | 4 |
| Run-21 | Activated CB-2 | Fe | B | 4 | 5.9 | 30 | 450 | 6 |
| Run-22 | Activated CB-2 | Fe | B | 6 | 7.5 | 30 | 450 | 6 |
| Run-23 | Activated CB-2 | Fe | C | 4 | 7.1 | 30 | 450 | 8 |
| Run-24 | Activated CB-2 | Fe | C | 6 | 8.1 | 30 | 450 | 8 |
| Run-25 | Activated CB-2 | Co | A | 4 | 5.1 | 30 | 550 | 5 |
| Run-26 | Activated CB-2 | Co | B | 4 | 5.9 | 30 | 550 | 5 |
| Run-27 | Activated CB-2 | Co | C | 4 | 6.7 | 30 | 550 | 5 |
| Run-28 | Activated CB-2 | Pt | A | 10 | 3.1 | 20 | 350 | 3 |
| Run-29 | Activated CB-2 | Pt | A | 10 | 4.3 | 20 | 350 | 4 |
| Run-30 | Activated CB-2 | Pt | A | 10 | 5.3 | 20 | 350 | 4 |
| Run-31 | Activated CB-2 | Pt | A | 10 | 6.8 | 20 | 350 | 5 |
| Run-32 | Activated CB-2 | Pt | A | 15 | 3.4 | 20 | 350 | 3 |
| Run-33 | Activated CB-2 | Co | A | 4 | 5.1 | 25 | 350 | 4 |
| Run-34 | Activated CB-2 | Co | A | 4 | 5.1 | 40 | 450 | 4 |
| Run-35 | Activated CB-2 | Co | A | 4 | 5.1 | 20 | 400 | 3 |
| Run-36 | Activated CB-2 | Co | A | 4 | 5.1 | 40 | 450 | 3 |
| Run-37 | Activated CB-2 | Co | A | 4 | 5.1 | 30 | 650 | 3 |
| Run-38 | Activated CB-2 | Co | A | 4 | 5.1 | 20 | 400 | 3 |
| Run-39 | Activated CB-2 | Co | A | 6 | 5.9 | 20 | 400 | 3 |
| Run-40 | EC-1800 | Co | B | 5 | 6.3 | 20 | 450 | 4 |
| Run-41 | EC-1800 | Co | B | 5 | 6.3 | 20 | 500 | 5 |
| Run-42 | SC-2100 | Co | B | 5 | 4.6 | 20 | 350 | 5 |
| Run-43 | MH-1800 | Co | B | 5 | 4.9 | 20 | 400 | 5 |
| Run-44 | Activated CB-1-H$_2$O | — | — | — | — | — | — | — |
| Run-45 | MH-1800-Air540 | — | — | — | — | — | — | — |
| Run-46 | MH-1800-Air570 | — | — | — | — | — | — | — |

| | second heat treatment | | |
|---|---|---|---|
| Experiment number | Before/after catalyst-based activation | Treatment temperature °C | Remarks |
| Run-0 | No | | C |
| Run-1 | No | | C |
| Run-2 | No | | C |
| Run-3 | No | | E |
| Run-4 | No | | E |
| Run-5 | No | | E |
| Run-6 | No | | E |
| Run-7 | No | | C |
| Run-8 | No | | C |
| Run-9 | No | | E |
| Run-10 | No | | E |
| Run-11 | No | | E |
| Run-12 | No | | E |
| Run-13 | No | | C |
| Run-14 | No | | E |
| Run-15 | No | | C |
| Run-16 | No | | E |
| Run-17 | No | | E |
| Run-18 | No | | E |
| Run-19 | No | | E |

TABLE 1-continued

| Run | | | |
|---|---|---|---|
| Run-20 | | No | C |
| Run-21 | | No | E |
| Run-22 | | No | C |
| Run-23 | | No | C |
| Run-24 | | No | C |
| Run-25 | | No | E |
| Run-26 | | No | E |
| Run-27 | | No | E |
| Run-28 | | No | E |
| Run-29 | | No | E |
| Run-30 | | No | E |
| Run-31 | | No | E |
| Run-32 | | No | E |
| Run-33 | Before | 1800 | E |
| Run-34 | Before | 1800 | E |
| Run-35 | After | 1800 | E |
| Run-36 | After | 1900 | E |
| Run-37 | Before and after | 1800/2100 | E |
| Run-38 | | No | E |
| Run-39 | | No | E |
| Run-40 | | No | E |
| Run-41 | | No | E |
| Run-42 | | No | E |
| Run-43 | | No | E |
| Run-44 | | — | C |
| Run-45 | | — | C |
| Run-46 | | — | C |

TABLE 2

| | | Physical properties of carbon material | | | | Characteristics at high current of fuel cell | | |
| | | BET surface | | | | | | |
| Experiment number | Source carbon material | area $m^2/g$ | $\Delta S_{0.47-0.9}$ mL/g | $P_{close}/P_0$ | $\Delta G$ $cm^{-1}$ | $\Delta V_{0.2-0.9}$ mL/g | Output before durability test | Output after durability test | Remarks |
|---|---|---|---|---|---|---|---|---|---|
| Run-0 | Activated CB-1 | 895 | <u>37</u> | 0.42 | 65 | 350 | D | D | C |
| Run-1 | Activated CB-1 | 910 | <u>36</u> | <u>0.45</u> | 68 | 365 | D | D | C |
| Run-2 | Activated CB-1 | 920 | 32 | <u>0.47</u> | 68 | 365 | D | D | C |
| Run-3 | Activated CB-1 | 930 | 28 | 0.51 | 69 | 370 | B | B | E |
| Run-4 | Activated CB-1 | 930 | 27 | 0.54 | 68 | 375 | A | A | E |
| Run-5 | Activated CB-1 | 935 | 26 | 0.62 | 69 | 365 | A | A | E |
| Run-6 | Activated CB-1 | 915 | 29 | 0.68 | 68 | 365 | B | B | E |
| Run-7 | Activated CB-1 | 885 | 27 | <u>0.72</u> | 69 | 365 | B | D | C |
| Run-8 | Activated CB-1 | 900 | <u>36</u> | <u>0.42</u> | 65 | 355 | D | D | C |
| Run-9 | Activated CB-1 | 910 | 31 | 0.53 | 67 | 355 | B | B | E |
| Run-10 | Activated CB-1 | 935 | 27 | 0.59 | 69 | 365 | A | A | E |
| Run-11 | Activated CB-1 | 925 | 28 | 0.58 | 68 | 375 | B | B | E |
| Run-12 | Activated CB-1 | 910 | 28 | 0.61 | 68 | 380 | B | B | E |
| Run-13 | Activated CB-1 | 850 | 27 | <u>0.73</u> | 69 | 355 | D | D | C |
| Run-14 | Activated CB-1 | 915 | 27 | 0.55 | 68 | 365 | B | B | E |
| Run-15 | Activated CB-1 | 910 | <u>37</u> | <u>0.45</u> | 65 | 355 | D | D | C |
| Run-16 | Activated CB-1 | 925 | 21 | 0.63 | 71 | 370 | A | B | E |
| Run-17 | Activated CB-1 | 930 | 22 | 0.55 | 67 | 355 | A | A | E |
| Run-18 | Activated CB-1 | 925 | 20 | 0.61 | 67 | 360 | A | A | E |
| Run-19 | Activated CB-2 | 1085 | 33 | 0.66 | 71 | 520 | B | C | E |
| Run-20 | Activated CB-2 | 1100 | <u>37</u> | <u>0.75</u> | 73 | 530 | D | D | C |
| Run-21 | Activated CB-2 | 1110 | 31 | 0.68 | 72 | 550 | A | A | E |
| Run-22 | Activated CB-2 | 1075 | <u>36</u> | <u>0.72</u> | <u>76</u> | 565 | D | D | C |
| Run-23 | Activated CB-2 | 1105 | <u>38</u> | <u>0.71</u> | <u>77</u> | 560 | D | D | C |
| Run-24 | Activated CB-2 | 1095 | <u>37</u> | <u>0.74</u> | 73 | 580 | D | D | C |
| Run-25 | Activated CB-2 | 1255 | 22 | 0.53 | 73 | 535 | A | B | E |
| Run-26 | Activated CB-2 | 1205 | 19 | 0.59 | 72 | 545 | A | B | E |
| Run-27 | Activated CB-2 | 1185 | 19 | 0.65 | 72 | 560 | A | A | E |
| Run-28 | Activated CB-2 | 1085 | 23 | 0.53 | 73 | 535 | A | A | E |
| Run-29 | Activated CB-2 | 865 | 15 | 0.54 | 73 | 605 | A | A | E |
| Run-30 | Activated CB-2 | 1095 | 23 | 0.56 | 73 | 545 | A | A | E |
| Run-31 | Activated CB-2 | 1070 | 22 | 0.61 | 71 | 565 | A | A | E |
| Run-32 | Activated CB-2 | 1060 | 18 | 0.54 | 73 | 550 | A | A | E |
| Run-33 | Activated CB-2 | 460 | 31 | 0.48 | 53 | <u>115</u> | C | C | E |
| Run-34 | Activated CB-2 | 530 | 18 | 0.49 | 61 | <u>145</u> | B | B | E |
| Run-35 | Activated CB-2 | 955 | 31 | 0.53 | 59 | 495 | B | B | E |
| Run-36 | Activated CB-2 | 895 | 32 | 0.58 | 52 | 445 | A | A | E |
| Run-37 | Activated CB-2 | 620 | 25 | 0.55 | 46 | 315 | A | A | E |
| Run-38 | Activated CB-2 | 1350 | 32 | 0.55 | 72 | 535 | A | A | E |
| Run-39 | Activated CB-2 | 1350 | 32 | 0.55 | 72 | 545 | A | A | E |

TABLE 2-continued

| | | Physical properties of carbon material | | | | | Characteristics at high current of fuel cell | | |
| | | BET surface | | | | | | | |
| Experiment number | Source carbon material | area m$^2$/g | $\Delta S_{0.47-0.9}$ mL/g | $P_{close}/P_0$ | $\Delta G$ cm$^{-1}$ | $\Delta V_{0.2-0.9}$ mL/g | Output before durability test | Output after durability test | Remarks |
|---|---|---|---|---|---|---|---|---|---|
| Run-40 | EC-1800 | 465 | 3 | 0.51 | 48 | 435 | C | C | E |
| Run-41 | EC-1800 | 480 | 7 | 0.52 | 47 | 445 | B | C | E |
| Run-42 | SC-2100 | 1165 | 11 | 0.53 | 55 | 350 | A | A | E |
| Run-43 | MH-1800 | 1485 | 34 | 0.57 | 59 | 635 | B | B | E |
| Run-44 | Activated CB-1-H$_2$O | 985 | <u>46</u> | <u>0.42</u> | 72 | 420 | D | D | C |
| Run-45 | MH-1800-Air540 | <u>1575</u> | 12 | <u>0.42</u> | 66 | 685 | D | D | C |
| Run-46 | MH-1800-Air570 | <u>1635</u> | <u>0.4</u> | <u>0.43</u> | 69 | <u>710</u> | D | D | C |

<5. Evaluation>

Experiment number Run-0 is an example in which the activation treatment according to the present embodiment was not performed, and the characteristics at high current were inferior. In Experiment numbers Run-1 to 7, the support rate of an activation catalyst was varied in a range of from 1 to 11% by mass. As a result, when the support rate was from 3 to 9% by mass, a carbon material as a catalyst support satisfying the requirements (A) to (E) could be produced. In a cell using a carbon material as a catalyst support that satisfies the requirements (A) to (E), any of the characteristics at high current was superior.

In particular, with respect to the carbon materials as a catalyst support of Experiment numbers Run-3 to 6 in which the relative pressure $P_{close}/P_0$ at which the hysteresis loop closes was in a range of from 0.50 to 0.70, any of the characteristics at high current before or after the durability test was superior.

In Experiment numbers Run-8 to 13 the treatment temperature in the first heat treatment step was selected within a range of from 250 to 800° C. In doing so, when the treatment temperature was from 300 to 700° C., a carbon material as a catalyst support satisfying the requirements (A) to (E) could be produced. The characteristics at high current before and after the durability test were also superior.

In Experiment numbers Run-14 to 16, the oxygen concentration and the treatment time in the first heat treatment were varied. When the oxygen concentration was as low as 5% by volume, a carbon material as a catalyst support satisfying the requirements (A) to (E) could be produced by securing enough treatment time (see Run-14). The characteristics at high current before and after the durability test were also superior. Meanwhile, when the oxygen concentration was as high as 80% by volume, a carbon material as a catalyst support satisfying the requirements (A) to (E) could be produced by shortening the treatment time (see Run-16). The characteristics at high current before and after the durability test were also superior. However, when the treatment time was too short, a carbon material as a catalyst support satisfying the requirements (A) to (E) could not be produced (see Run-15).

In Experiment numbers Run-17 and 18, the supporting method was changed. In these examples, even when the supporting method was changed, a carbon material as a catalyst support satisfying the requirements (A) to (E) could be produced. The characteristics at high current before and after the durability test were also superior.

In Experiment numbers Run-19 to 24, Fe was used as the activation catalyst, and the supporting method was varied. In these examples, even when the activation catalyst was Fe and the supporting method was changed, a carbon material as a catalyst support satisfying the requirements (A) to (E) could be produced by performing a catalyst-based activation treatment according to this embodiment (see Run-19, and 21).

In Experiment numbers Run-25 to 27, Co was used as the activation catalyst, and the supporting method was varied. In these examples, even when Co was used as the activation catalyst, a carbon material as a catalyst support satisfying the requirements (A) to (E) could be produced. The characteristics at high current before and after the durability test were also superior.

In Experiment numbers Run-28 to 32, Pt was used as the activation catalyst, and then redirected to the fuel cell catalyst. Even in these cases, a carbon material as a catalyst support satisfying the requirements (A) to (E) could be produced. The characteristics at high current before and after the durability test were also superior.

Meanwhile, the nitrogen adsorption and desorption isotherm of the carbon material as a catalyst support in Run-29 is shown in FIG. 5, and an enlarged view showing the vicinity of the relative pressure $P_{close}/P_0$ where the hysteresis loop closes of the nitrogen adsorption and desorption isotherm shown in FIG. 5 is shown in FIG. 6. As shown in FIGS. 5 and 6, the carbon material as a catalyst support in Run-32, which characteristics at high current before and after the durability test are also superior, satisfies the nitrogen desorption characteristics according to the requirements (A) to (C).

In Experiment numbers Run-33 to 37, Co was used as the activation catalyst, and the second heat treatment step was performed. In this way, in Run-33 and 34 not only the requirements (A) to (D) were satisfied, and in Run-35 to 37 not only the requirements (A) to (E) were satisfied, but also a carbon material as a catalyst support having a further enhanced crystallinity could be produced. The characteristics at high current before and after the durability test were also superior.

In Experiment numbers Run-38 and 39, Co was used as the activation catalyst, and then redirected to the fuel cell catalyst. Even in this case, a carbon material as a catalyst support satisfying the requirements (A) to (E) could be produced. The characteristics at high current before and after the durability test were also superior.

In Experiment numbers Run-40 and 43, porous carbon as the starting material was varied, Co was used as the activation catalyst, and the supporting method was changed. Even in this case, a carbon material as a catalyst support satisfying the requirements (A) to (E) could be produced. The characteristics at high current before and after the durability test were also superior.

Particularly, from comparison between Experiment number Run-40 and Experiment number Run-41, the carbon material as a catalyst support in Experiment number Run-41, in which the hysteresis loop area $\Delta S_{0.47-0.9}$ was 5 mL/g or more, exhibited superior characteristics at high current.

In Experiment number Run-44, a conventional gas-based activation was performed for the activated CB-1. The carbon material as a catalyst support in Experiment number Run-44 did not satisfy the requirements (B) and (C), and as a result the characteristics at high current were poor.

In Run 45 and 46, conventional gas-based activation (gas-based activation with air) was performed on the porous carbon material (MH-1800).

The masses of the carbon materials as a catalyst support in Run-45 and 46 were reduced by 25% by mass and 49% by mass respectively by means of gas-based activation with air (air oxidation treatment). The hysteresis loop area $\Delta S_{0.47-0.9}$ was remarkably decreased by gas-based activation with air. Specifically, the area $\Delta S_{0.47-0.9}$ of MH-1800 was 34 mL/g, meanwhile, and the area $\Delta S_{0.47-0.9}$ of MH-1800-Air540 was 12 mL/g, but with respect to MH-1800-Air570 a loop substantially disappeared and (that is, the adsorption and the desorption curve coincided), and the calculated value of the area $\Delta S_{0.47-0.9}$ was 0.4 mL/g.

Also, the relative pressure $P_{close}/P_0$ at which the hysteresis loop closes was decreased.

Consequently, the carbon material as a catalyst support in Run-45 did not satisfy the requirements (A) and (C), and as a result the characteristics at high current were poor.

Further, the carbon material as a catalyst support in Run-46 did not satisfy the requirements (A), (B), (C) and (E), and as a result the characteristics at high current were poor.

It was confirmed that a hysteresis loop was formed in a range of relative pressure $P/P_0$ of more than 0.47 but not more than 0.90 with respect to the nitrogen adsorption and desorption isotherm in the example of the carbon material as a catalyst support in each Run for which "E" is denoted in the column of Remarks in Tables 1 and 2.

The preferred embodiment of the present disclosure has been described in detail with reference to the accompanying drawings, but the technical scope of the present disclosure is not limited to those examples. A person skilled in the art can obviously find various alterations and modifications within the scope of the technical ideas in the appended claims, and it should be understood that they will naturally come under the technical scope of the present disclosure.

Reference Signs in the figures are listed below.
A Hysteresis loop
Bottleneck pore
20a, 30a Bottle part
20b, 30b Neck part
100 Polymer electrolyte fuel cell
110, 120 Separator
130, 140 Gas diffusion layer
150, 160 Catalyst layer
170 Electrolyte membrane The entire contents of the disclosures by Japanese Patent Application No. 2017-127399 are incorporated herein by reference.

All the document, patent application, and technical standards cited herein are also herein incorporated to the same extent as provided for specifically and severally with respect to an individual document, patent application, and technical standard to the effect that the same should be so incorporated by reference.

The invention claimed is:

1. A support for a polymer electrolyte fuel cell catalyst, comprising a carbon material, and satisfying the following requirements (A), (B), (C), and (D):
    (A) a specific surface area according to a BET analysis of a nitrogen adsorption isotherm is from 450 to 1500 m$^2$/g;
    (B) a nitrogen adsorption and desorption isotherm forms a hysteresis loop in a range of relative pressure $P/P_0$ of more than 0.47 but not more than 0.90, and a hysteresis loop area $\Delta S_{0.47-0.9}$ is from 5 to 35 mL/g;
    (C) a relative pressure $P_{close}/P_0$ at which the hysteresis loop closes is more than 0.47 but not more than 0.70; and
    (D) a half-width of a G band detected by Raman spectrometry in a range of from 1500 to 1700 cm$^{-1}$ is from 45 to 75 cm$^{-1}$.

2. The support for a polymer electrolyte fuel cell catalyst according to claim 1, further satisfying the following requirement (E):
    (E) an adsorption volume $V_{0.2-0.9}$ measured from the nitrogen adsorption isotherm in a relative pressure range of from 0.20 to 0.90 is from 150 to 700 mL/g.

3. The support for a polymer electrolyte fuel cell catalyst according to claim 1, wherein the hysteresis loop area $\Delta S_{0.47-0.9}$ is from 15 to 35 mL/g.

4. The support for a polymer electrolyte fuel cell catalyst according to claim 1, wherein the relative pressure $P_{close}/P_0$ at which the hysteresis loop closes is from 0.50 to 0.70.

5. A method of producing a support for a polymer electrolyte fuel cell catalyst according to claim 1, the method comprising:
    a support step of supporting an activation catalyst, which promotes an activation reaction on a porous carbon material, in pores in the porous carbon material, to produce a carbon material supporting the activation catalyst; and
    a first heat treatment step of heat-treating the carbon material supporting the activation catalyst in an oxygen-containing atmosphere in a range of from 300° C. to 700° C.

6. The method of producing a support for a polymer electrolyte fuel cell catalyst according to claim 5, further comprising a second heat treatment step of heating the carbon material supporting the activation catalyst in a vacuum or in an inert gas atmosphere in a range of from 1600 to 2100° C., the second heat treatment step being performed at least one of before or after the first heat treatment step.

7. The method of producing a support for a polymer electrolyte fuel cell catalyst according to claim 5, wherein:
    in the supporting step, in a case in which a particle diameter of the activation catalyst is from 2 to 7 nm, and the activation catalyst is a noble metal element, a support rate of the activation catalyst is from 3 to 20% by mass, and in a case in which the activation catalyst is a 3d element, a support rate of the activation catalyst is from 3 to 9% by mass; and
    in the first heat treatment step, an oxygen concentration of the oxygen-containing atmosphere is from 5 to 100% by volume with respect to a total volume of atmosphere gas, and a heat treatment time is from 20 min to 20 hours.

8. The method of producing a support for a polymer electrolyte fuel cell catalyst according to claim 5, further comprising an activation catalyst removal step of removing the activation catalyst that is performed after the first heat treatment step.

9. A catalyst layer for a polymer electrolyte fuel cell comprising the support for a polymer electrolyte fuel cell catalyst according to claim 1.

10. A fuel cell, comprising the catalyst layer for a polymer electrolyte fuel cell according to claim 9.

11. The fuel cell according to claim 10, wherein the catalyst layer for a polymer electrolyte fuel cell is a catalyst layer on a cathode side.

12. A support for a polymer electrolyte fuel cell catalyst, comprising a carbon material, and satisfying the following requirements (A), (B), (C), and (D):

(A) a specific surface area according to a BET analysis of a nitrogen adsorption isotherm is from 450 to 1500 $m^2/g$;

(B) a nitrogen adsorption and desorption isotherm forms a hysteresis loop in a range of relative pressure $P/P_0$ of more than 0.47 but not more than 0.90, and a hysteresis loop area $\Delta S_{0.47\text{-}0.9}$ is from 1 to 35 mL/g;

(C) a relative pressure $P_{close}/P_0$ at which the hysteresis loop closes is from 0.50 to 0.70; and (D) a half-width of a G band detected by Raman spectrometry in a range of from 1500 to 1700 $cm^{-1}$ is from 45 to 75 $cm^{-1}$.

\* \* \* \* \*